(12) United States Patent  
DiEsposti

(10) Patent No.: US 7,688,261 B2  
(45) Date of Patent: Mar. 30, 2010

(54) GLOBAL POSITION SYSTEM (GPS) USER RECEIVER AND GEOMETRIC SURFACE PROCESSING FOR ALL-IN-VIEW COHERENT GPS SIGNAL PRN CODES ACQUISITION AND NAVIGATION SOLUTION

(75) Inventor: Raymond S. DiEsposti, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 11/501,556

(22) Filed: Aug. 9, 2006

(65) Prior Publication Data

US 2009/0171583 A1 Jul. 2, 2009

Related U.S. Application Data

(63) Continuation-in-part of application No. 11/376,681, filed on Mar. 15, 2006, now Pat. No. 7,579,986.

(51) Int. Cl.
*G01S 1/02* (2006.01)

(52) U.S. Cl. .............................. 342/357.12; 342/357.15

(58) Field of Classification Search ............ 342/357.02, 342/357.06, 357.12, 357.15; 701/207, 213, 701/215

See application file for complete search history.

(56) References Cited

U.S. PATENT DOCUMENTS 5,781,156 A 7/1998 Krasner 5,812,961 A 9/1998 Enge et al.
6,373,432 B1 4/2002 Rabinowitz et al.
6,914,931 B2 7/2005 Douglas et al.

FOREIGN PATENT DOCUMENTS

EP 1 146 349 A3 3/2001
WO WO 00/36431 6/2000

OTHER PUBLICATIONS

Kaplan, Elliott D. "Understanding GPS Principles and Applications," first edition, 1996, pp. 212-213, 220-223.
Len Sheynblat et al., "Description of a Wireless Integrated SmartServer™/Client System Architecture," ION 55th Annual Meeting, Jun. 28-30, 1999, Cambridge, MA, pp. 667-675.

(Continued)

*Primary Examiner*—Dao L Phan
(74) *Attorney, Agent, or Firm*—Harness, Dickey & Pierce, P.L.C.

(57) ABSTRACT

A method and system for enabling a more robust detection, acquisition and positioning solution capability for a GPS device. The system and method uses GPS satellite ranging signals based on a simultaneous, all-in-view coherent PRN code signal processing scheme, rather than acquisition of GPS signals one at a time, in order to predict a location of a GPS user receiver. Additionally, image processing techniques, ultra-tight coupling processing techniques, or a combination thereof, are used to further enhance accuracy in determining the location of the user receiver. Signal processing techniques are used to determine the location of the GPS user receiver when no GPS satellite ranging signals can be individually detected, or when only one or two strong GPS satellite ranging signals can be individually detected in weak signal environments, jamming conditions, and a combination thereof.

20 Claims, 9 Drawing Sheets

OTHER PUBLICATIONS

Raymond DiEsposti,"GPS PRN Code Signal Processing and Receiver Design for Simultaneous All-in-View Coherent Signal Acquistion and Navigation Solution Determination," ION NTM 2007, Jan. 22-24, 2007, San Diego, CA, pp. 91-103.

ION GNSS 18th International Technical Meeting of the Satellite Division, Sep. 13-16, 2005, Long Beach, CA, p. 1154-1159.

GPS World News and Applications of the Global Position System, Apr. 1998, "Of Mutual Benefit: Merging GPS and Wireless Communications", p. 44-48.

Inside GNSS, Apr. 2006, "NovAtel Gets New Financial Marks, Launches First Galileo Receiver," p. 61.

Lozow, J. B. Navigation: Journal of the Institute of Navigation, vol. 44, No. 1, Spring 1997, Analysis of Direct P(Y)-Code Acquisition, p. 89-97.

Dierendonck, A.J. Van. Institute of Navigation Satellite Division's 4th International Technical Meeting. ION GPS-91, Albuquerque, MN, Sep. 9-13, 1991, "Novatel's GPS Receiver. The High Performance OEM Sensor of the Future."

DiEsposti, Raymond; DiLellio, James; Kelley, Clifford. Navigation Systems, The Boeing Company.; Dorsey, Arthur; Management & Data Systems, Martin, Lockheed; Fliegel, Henry, Berg, John; Edgar, Clyde, GPS JPO, The Aerospace Corporation; McKendree, Thomas, Navigation and Landing Systems; Fullerton Raytheon; Shome, Pradipta, Office of Commercial Space Transportation, Federal Aviation Administration. ION NTM 2004, Jan. 26-28, 2004, San Diego, CA. "The Proposed State Vector Representation of Broadcast Navigation Message for User Equipment Implementation of GPS Satellite Ephemeris Progagation," p. 294-312.

DiEsposti, R., Saks, S., Jocic, L. & Abbott, A., (1998) The Benefits of Integrating GPS, INS and PCS. 11th Int. Tech. Meeting of the Satellite Division of the U.S. Inst. of Navigation, Nashville, Tennessee, Sep. 15-18, 327-331.

DiEsposti, R. et al. "GPS PRN Code Signal Processing and Receiver Design for Simultaneous All-in-View Coherent Signal Acquisition and Navigation Solution Determination," at least prior to Aug. 9, 2006, pp. 1-12.

Kaniuth, Roland et al. "A Snap-Shot Positioning Approach for a High Integrated GPS/Galileo Chipset," ION GNSS 18th International Technical Meeting of Satellite Division, 13-16 Sep. 2005, Long Beach, CA, pp. 1153-1159.

Sirola, N. et al. "GPS Position Can Be Computed without the Navigation Data," ION GPS 2002, 24-27 Sep. 2002, Portland, OR, pp. 2741-2744.

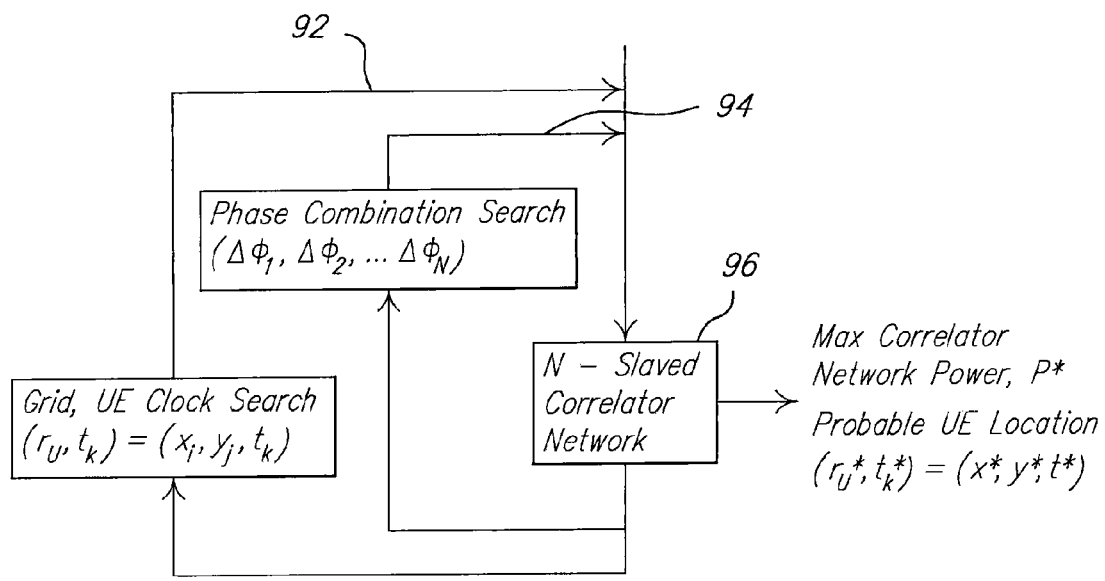
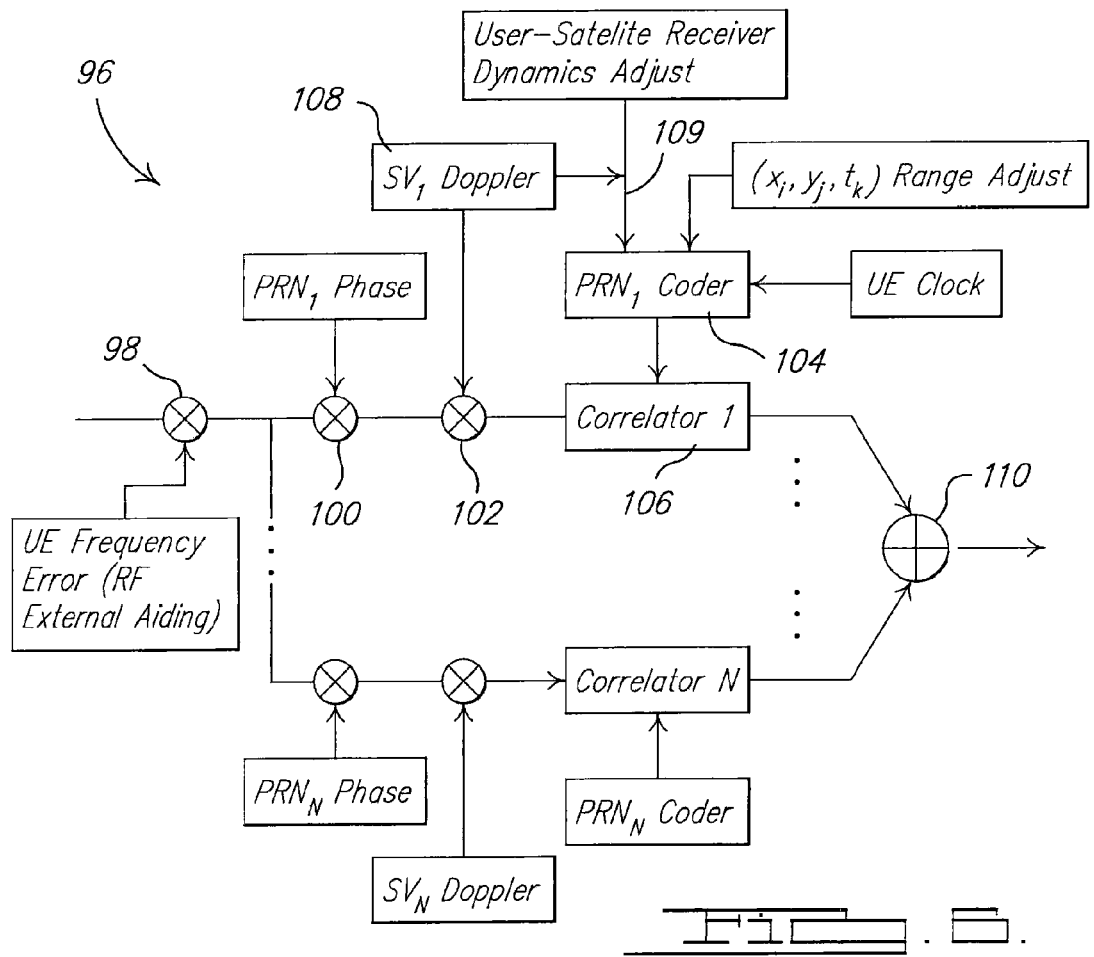
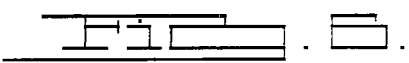

GLOBAL POSITION SYSTEM (GPS) USER RECEIVER AND GEOMETRIC SURFACE PROCESSING FOR ALL-IN-VIEW COHERENT GPS SIGNAL PRN CODES ACQUISITION AND NAVIGATION SOLUTION

CROSS-REFERENCE TO RELATED APPLICATIONS

This application is a continuation-in-part of U.S. patent application Ser. No. 11/376,681 filed on Mar. 15, 2006, now U.S. Pat. No. 7,579,986. The disclosure of the above application is incorporated herein by reference. The present disclosure is also related to concurrently filed application U.S. Ser. No. 11/501,543.

FIELD

The present invention relates to a method and system for global positioning (GP). More specifically, the present invention relates to a system and method for a global positioning system (GPS) user receiver for acquiring GPS signals from satellites to determine a location of the GPS user receiver using geometric surface processing techniques.

BACKGROUND

For decades, the ability to obtain real time location and position information for mobile platforms and/or individuals has been a highly sought after technology. Since the implementation of the Global Positioning System (GPS), a worldwide radio navigation system introduced by the U.S. Air Force, this has become a reality. The GPS includes a constellation of satellites, ground or base stations, and at least one GPS user receiver.

The locations of the satellites are used as reference points to calculate positions of the GPS user receiver, which is usually accurate to within meters, and sometimes even within centimeters. Each of the satellites, the ground stations, and the GPS user receiver has preprogrammed timed signals that start at precise times. In order to lock on to the signals broadcasted by the satellites, the ground station and GPS user receiver slew their respective internal generated signals relative to time as predicted by their respective internal clocks. When the signals are locked, the GPS user receiver makes ranging measurements to each satellite called "pseudoranges." These pseudorange measurements include the actual ranges to the satellites, in addition to an error associated with the receiver clock time offset relative to GPS time, plus other smaller errors. The ground stations included in the GPS control segment network provide ranging measurements which are used to generate predictions for the satellites clocks and orbits. These predictions are periodically uploaded to the satellites and the satellites broadcast this data to the user receiver to support the user receiver positioning function.

Each satellite transmits a GPS satellite signal, including a unique Pseudo-Random Noise (PRN) Code and a Navigation (Nav) message, on two carrier frequencies, L1 and L2. The L1 carrier is 1575.42 MHz and carries both the Nav message and the pseudo-random noise code for timing. The L2 carrier is 1227.60 MHz. The L2 signal is normally used for military purposes. There are two types of PRN codes, called Coarse Acquisition (C/A) code and Precise (P) code. The C/A code, intended for civilian use, modulates the L1 carrier at a rate of 1.023 MHz and repeats every 1023 bits, thus the length of the C/A code is one millisecond. The P code, intended for military use, repeats on a seven-day cycle and modulates both the L1 and L2 carriers at a 10.23 MHz rate. When the P code is encrypted, it is called the "Y" code. Additionally, the Nav message is a low frequency signal added to the codes on L1 and L2 that gives information about the satellites' orbits, their clocks corrections and other system status. Ideally, as the GPS satellite ranging signals are broadcast to Earth, the GPS satellite ranging signals would directly reach the GPS user receiver with a range delay associated with speed of light propagation through a vacuum in an inertial reference system. However, along the route to the GPS user receiver, the GPS satellite ranging signals encounter some sources that cause the GPS satellite signals to be delayed. These signals cause delay, in addition to the path delay associated with the speed of light propagation relative to range prediction models, and thus contribute an error. The potential sources of such delays and errors include satellite ephemeris and clock errors, selective availability (SA), ionospheric and atmospheric effects, multi-paths, and receiver clock error.

In order to reduce or eliminate the delays and errors in the GPS satellite ranging signals, other ground stations, called differential GPS ground stations, are often used. Each differential ground station is stationary and ties all the satellite signal measurements into a local reference. Additionally, a differential ground station closest to the GPS user receiver receives the GPS satellite ranging signals containing the same delays and errors related to the GPS satellite signals as the GPS satellite signals acquired and tracked by the GPS user receiver for the same epoch time. The differential ground station is typically within a few tens of kilometers of the GPS user receiver. The differential ground station measures the range delay or timing errors and then provides this correction information to the GPS user receiver over a radio frequency (RF) wireless communications link. The GPS user receiver may be stationary for the time being, or may be roaming. The GPS user receiver applies these corrections to its ranging measurements to reduce the above errors. The differential ground station knows its fixed position and calculates an expected travel time for each GPS satellite signal. The calculation is based on a broadcast ephemeris of where each satellite should be positioned in space. The differential ground station compares a calculated travel time for the satellite ranging signals to an actual travel time measured for the signals, for all the satellites to determine the error correction information related to the signals for each satellite. The differential ground station then transmits the error correction information for each satellite to the GPS user receiver.

For conventional signal processing, when the GPS user receiver is first turned ON or activated to begin processing GPS signals, it searches for, acquires and locks on to the GPS satellite ranging signals from multiple satellites in view. The GPS user receiver also makes distance measurements (called pseudoranges) for each satellite PRN code signal in view of the GPS user receiver. The GPS receiver demodulates the Nav message data superimposed on the PRN code signals, applies any error corrections sent to it from the ground station if operating in the differential GPS mode, and uses this information to solve for the GPS user receiver's position and user receiver clock offset relative to GPS time. Additionally, in order to determine the distance between any satellite in view and the GPS user receiver, the GPS user receiver determines the actual travel time for the signal propagation delay and applies the error correction information received from the base station to calculate corrected travel time. The corrected travel time is then multiplied by the speed of light to determine the distance to the signal sending satellite. After acquiring the GPS satellite ranging signals of at least four satellites, the GPS user receiver solves for its position and time error relative to GPS time.

The conventional method of acquiring the GPS satellite ranging signals provides for the GPS user receiver to acquire one GPS satellite signal at a time. Signal acquisition is generally the most fragile phase associated with the GPS user receiver. One reason is that the C/A code is weak and a small level of interference, intermittent attenuation, or obstruction of the Line-of-Sight (LOS) from a satellite to the GPS user receiver can cause the acquisition process to fail for one or more of the ranging signals.

It would therefore be desirable to even further improve the signal acquisition process in a manner that better ensures that rapid, reliable and robust acquisition of the ranging signals can be made by a GPS user receiver. It would be especially desirable if these operations could be performed by a GPS user receiver in challenged environments associated with signal power attenuation or interference, e.g. in-doors, under foliage, or under jamming conditions.

SUMMARY

The present disclosure provides a method and user receiver to detect and acquire simultaneously a plurality of satellite ranging signals from each of a plurality of satellites in view of a GPS user receiver, while simultaneously estimating a location of the GPS user receiver.

The method involves receiving a set of initialization data, base-station location data, satellite ranging data, and time aiding data. A time synch function is received from the base station to synchronize a user receiver clock and ranging signals ranging data as received at a base station at an epoch time. Using this information, the user receiver then searches for the GPS signals within a Earth-reference search space region and a two-dimensional or three-dimensional search space grid based on the base-station-location data. The search space region includes a plurality of grid point locations. At least one of the satellite ranging signals from each of a plurality of satellites in view of the user receiver is simultaneously acquired. Searching over carrier phase angle combinations for received ranging signals at each of the plurality of grid points is performed. Power outputs of the received ranging signals at each of the plurality of grid point locations are combined to determine therefrom a probable location of the user receiver. At a probable grid point location, the power from all of the ranging signals will be coherently combined, corresponding to a maximum of the combined power output. The probable location associated with the maximum combined power is then analyzed to determine the reliability of the solution.

A GPS user receiver for rapidly determining a position of the user receiver in a global positioning system is also provided. The GPS user receiver includes a user interface, a base-station-receiving portion, a navigation system, and a control processing module. The user interface is adapted to generate a request signal and receive an indication of a location of the user receiver. The base-station-receiving portion uses a wireless assist link to receive initialization data and base-station-location data. This data is used to limit a search space region for satellite ranging signals to a predetermined geographic area circumscribing a present location of the user terminal. The base-station-receiving portion or control processing module also outputs a time synch function as received from the base station signal to synchronize a user receiver clock at an epoch time.

The navigation system is configured to receive the initialization data and the base-station location data and to search within the predetermined geographic area, which has a plurality of gird point locations, for at least one satellite ranging signal from a plurality of space-based GPS satellite that are within view of the user receiver. The navigation system is also configured to combine power outputs of all received ranging signals at each of the plurality of grid point locations within the predetermined geographic area and to output a maximum power output value. The control processing module communicates with the navigation system and is configured to receive the maximum power output in order to determine the location of the user receiver, and to output a location signal in response thereof to the user interface module.

The method and GPS receiver of the present disclosure allow for a more robust detection of GPS satellite ranging signals based on a simultaneous, all-in-view coherent PRN code signal processing scheme, rather than acquisition of GPS PRN code signals one at a time. Additionally, the method and GPS receiver may enable 10 dB or more improvement in signal-to-noise ratio (SNR) acquisition performance of the combined signals when compared to conventional acquisition approaches of acquiring GPS PRN code signals one at a time. The method and GPS receiver also automatically enables removal of ranging errors common to both the user and base station and minimizes the introduction of multi-path errors into code phase measurements.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The present invention will become more fully understood from the detailed description and the accompanying drawings, wherein:

FIG. 5 is a circuit schematic of an exemplary navigation processing module 90 for a user receiver used to implement the method of FIG. 1;

FIG. 6 is a circuit schematic of an exemplary network of slaved bank of correlators for the user receiver to implement the method of FIG. 1;

DETAILED DESCRIPTION

The following description of various embodiments is merely exemplary in nature and is in no way intended to limit the present disclosure, its application, or uses. As used herein, the term "module" refers to an application specific integrated circuit (ASIC), an electronic circuit, a processor (shared, dedicated, or group) and memory that execute one or more software or firmware programs, a bank of slaved correlators network, a combinatorial search logic circuit, and/or other suitable components that provide the described functionality.

Figure 1:
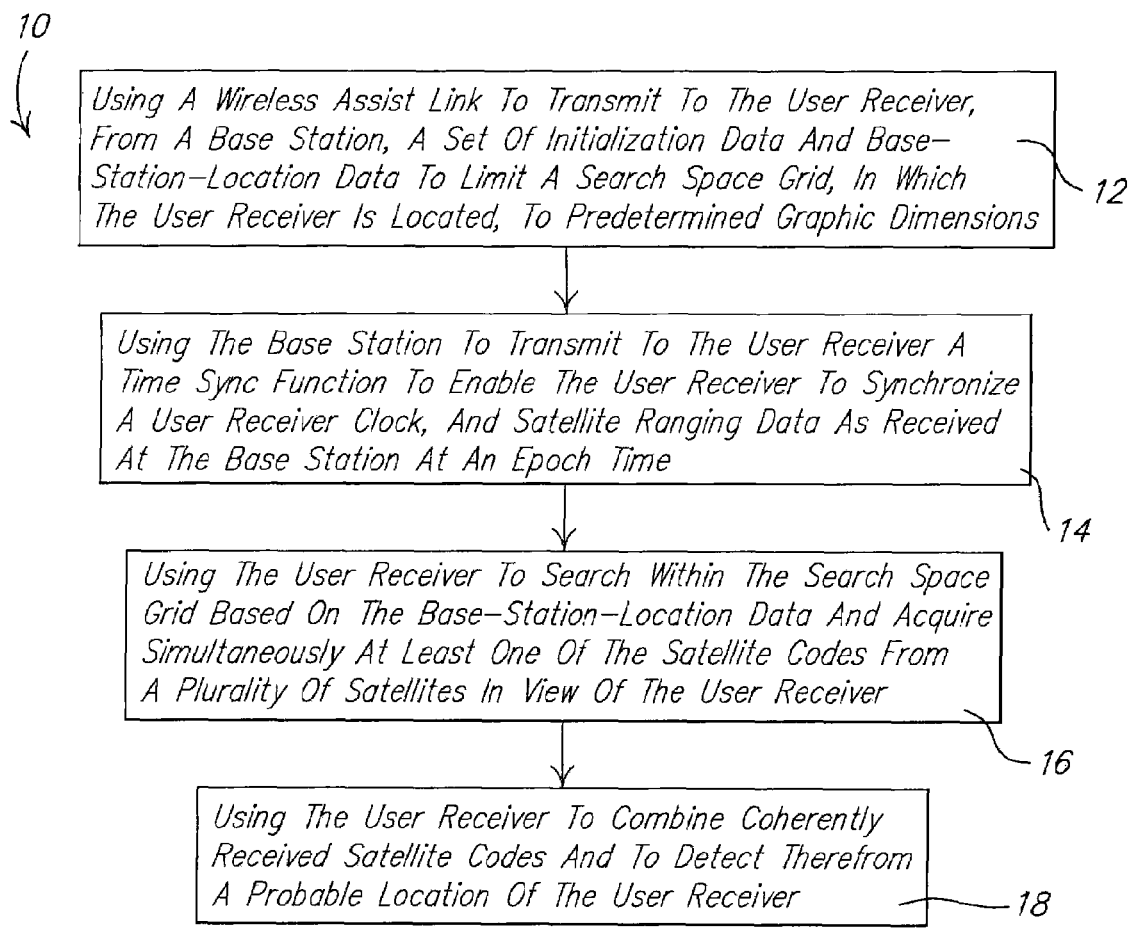
FIG. 1 is a flow chart of a method of the present disclosure for using inputs from a plurality of satellites that are in view of a global positioning system (GPS)

Referring to FIG. 1, the present disclosure illustrates a method 10 for using inputs from a plurality of satellites that are in view of a global positioning system (GPS) user receiver. The plurality of satellites includes at least three satellites up to all of the satellites in view of a user receiver. The method includes using a wireless assist link to transmit to the user receiver, from a base station, a set of initialization data and base-station-location data at operation 12. The set of initialization data includes almanac or satellite ephemeris and clock data, size or boundary data, and satellite ranging signal data including satellite ranging signal measurement data. The boundary data comprises predetermined geographic dimensions to limit the size of a search space region in which the user receiver is located. At operation 14, the base station transmits to the user receiver a GPS time synch function to allow the user receiver to synchronize its internal clock, and satellite ranging data, as measured at the base station at an epoch time, which is used to synchronize reception of the satellite codes in view of the user receiver.

After the GPS time synch function and other transmitted data are received by the user receiver, the user receiver starts a search within the search space region grid points. The search may be based on the set of initialization data provided by the base station. The user receiver acquires simultaneously a satellite code from each of the plurality of satellites in view of the user receiver, as indicated at operation 16. The user receiver may instead acquire all of a plurality of satellite PRN codes simultaneously from all satellites in view of the user receiver. At operation 18, while the user receiver is searching the grid points in the search space region, it combines a power output of each received satellite PRN code to determine a probable location of the user receiver. More specifically, the user receiver searches the search space region, combines the power output related to each received satellite code for a plurality of grid point locations within the search space region, and determines which grid point provides a maximum combined power output for the received satellite codes. At a grid point corresponding to the user location, the power in all of the satellite codes processed will be coherently combined, indicating a maximum power output. The maximum combined power output indicates a highest combined power output at a particular grid point location to identify the probable location of the user receiver.

Figure 2:
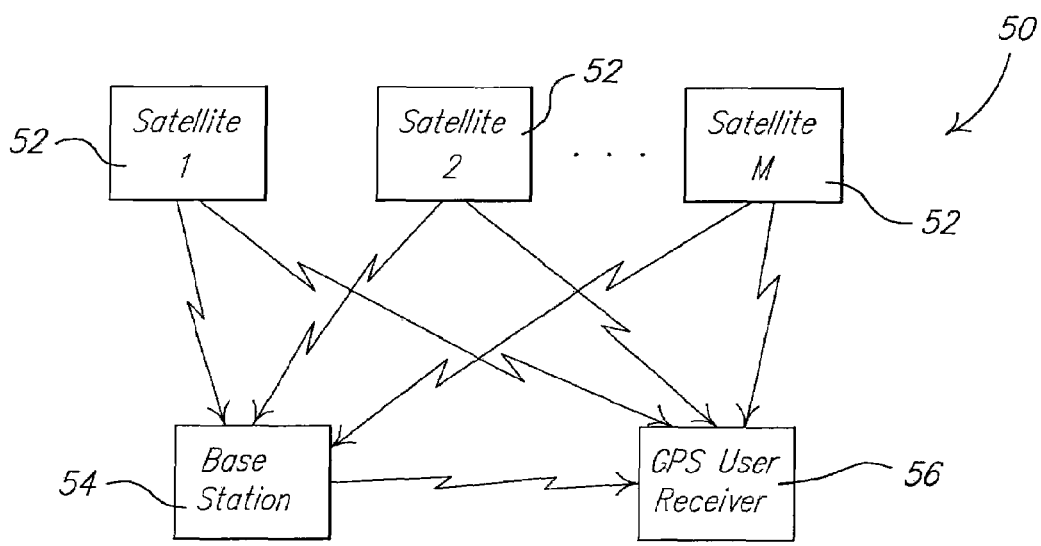
FIG. 2 is a block diagram of an exemplary system used to implement the method of FIG. 1.

Referring to FIG. 2, a global positioning system (GPS) 50 of the present disclosure is shown for implementing the above-described operations. The GPS 50 comprises a plurality of GPS satellites 52, a base station 54, and a GPS user receiver 56. The satellites 52 are each in wireless communication with the user receiver 56 and the base station 54. Additionally, the base station 54 is in wireless communication with the user receiver 56.

The locations of the satellites 52 are used as reference points to assist signal processing in order to determine the location of the user receiver 56. The satellites 52 comprise a constellation of "M" number of satellites in the Earth's orbit that are in view of the user receiver 56. Each one of the satellites 52 broadcasts one or more precisely synchronized GPS satellite ranging signals toward the Earth. The GPS ranging satellite signals include a Pseudo Random Noise (PRN) Code and Navigation (Nav) message carried on a carrier frequency, such as an L1 and/or L2 carrier frequency. The L1 carrier frequency is 1575.42 MHz and carries both the Nav message and the PRN code for timing. The L2 carrier frequency is 1227.60 MHz.

There are two types of PRN codes called Coarse Acquisition (C/A) code and Precise (P) code. The C/A code, intended for civilian use, modulates the L1 carrier at a rate of 1.023 MHz and repeats every 1023 bits. The P code, intended for military use, repeats on a seven-day cycle and modulates both the L1 and L2 carriers at a 10.23 MHz rate. When the P code is encrypted, it is called the "Y" code. Additionally, the Nav message is a low frequency signal added to the PRN codes that gives information about the satellite's orbit, clock corrections and other system status information.

As technology progresses, the satellites 52 may include more civilian and military codes on the L1 and L2 carriers and an additional carrier frequency called L5. For example, a satellite 52 may include two military codes and two civil signal codes on the L1 carrier, two military codes and one civil signal code on the L2 carrier, and two civil codes on the L5 carrier. Additionally, instead of GPS navigation system satellites 52, the satellites 52 may comprise other existing satellite navigation systems satellites, such as, for example, Wide Area Augmentation System (WAAS) satellites developed by the Federal Aviation Administration (FAA) and the Department of Transportation (DOT) or Galileo satellite radio navigation system satellites, an initiative launched by the European Union and the European Space Agency. Without loss of generality, the system 50 may incorporate GPS codes, or codes of other satellite navigation system signals, if available, e.g. an integrated GPS-Galileo user receiver.

The base station 54 comprises a ground station that includes a stationary receiver located at an accurately surveyed point. The base station 54 receives the GPS satellite ranging signals from each of the satellites 52. As each GPS satellite ranging signal is received by the base station 54 and the user receiver 56, the satellite signals may be adversely affected by ionosphere or atmospheric conditions, error in the GPS broadcast ephemeris and clock data, by multipath conditions, or other factors that may cause errors in the ranging signals reaching the base station 54 or the user receiver 56. The base station 54 transmits additional aiding data such as a unique set of initialization data, base-station-location data and size or boundary data. The set of initialization data includes GPS almanac or satellite ephemeris and clock data, and PRN ranging data including base station ranging measurements as received at the base station 54 at an epoch time. The boundary data comprises predetermined geographic dimensions to limit a search space region in which the user receiver 56 is located.

The user receiver 56 searches within the search space region based on the base-station-location data and acquires simultaneously at least one of the satellite codes from the satellites 52 in view of the user receiver 56. Additionally, the user receiver 56 may acquire simultaneously all of the satellite ranging codes from all of the satellites in view of the user receiver 56 in order to coherently combine, such as summing, received satellite codes and to detect therefrom a probable location of the user receiver 56. The user receiver 56 combines, or sums, a power output of each of received GPS ranging signals at each of the plurality of grid point locations within the predetermined geographic area, to determine a maximum power output value. The user receiver 56 uses the maximum power output value to extrapolate the probable location of the user receiver 56. The maximum power output value is indicative of a highest coherently combined power output of all PRN codes present for each of the grid point locations, and that location within the search space region associated with the maximum power identifies the probable location of the user receiver 56. The following paragraphs more specifically describe the functionally of the user receiver 56.

Through the wireless assist link, the user receiver 56 receives the set of initialization data to aid acquisition along with the base-station-location data, and the search region boundary data to assist in the acquisition search. Additionally, over the wireless link, the user receiver 56 is provided the GPS time synch function to reduce the search space associated with an unknown user clock error. The user receiver 56 also receives data on the accuracy of the time synch for use in the search from the base station 54. However, time synch accuracy may be inferred by the user receiver 56 based on the search region boundary data. Additionally, the user receiver 56 may utilize a time aiding function and a frequency aiding function from the base station to reduce user receiver clock and oscillator error in order to reduce the search space.

The time aiding function may take on several forms, such as GPS time transfer or time sampling control method. The time transfer method provides a GPS time synch function to the user receiver 56 using an external RF aiding signal from the base station. On the other hand, the time sampling control method includes the base station 54 providing a command to the user receiver 56 to sample the GPS satellite ranging signal at a time epoch close to a time epoch used by the base station 54 to measure the GPS satellite ranging signals.

Frequency aiding may be implemented by the user receiver 56 by implementing signal phase or frequency lock (e.g. phase lock loop (PLL)) onto a stable base station radio frequency (RF) carrier signal. If a base station signal is generated using a high quality ovenized crystal oscillator (OCXO) or an oscillator which is frequency calibrated by tracking the GPS satellite signals, the user receiver PLL will provide a frequency reference that is accurate and stable enough to reduce or eliminate frequency search. The user receiver PLL frequency reference will also support coherent integration times up to one second duration, following compensation for Doppler and motion of each of the satellites 52 relative to the user receiver 56.

Using the almanac or ephemeris data, the user receiver 56 can determine the number of GPS-satellite-ranging code signals in view for use to determine its location within the search space grid. The search space comprises a two-dimensional region of grid points. Alternatively, the search space may comprise a three-dimensional region of search grid points. For example, in order to determine a location for the two-dimensional case, at least three satellites 54 in view of the user receiver 56 will be needed. On the other hand, at least four satellites 54 are needed in order to determine a location of the user receiver 56 for a three-dimensional case. Additionally, the user receiver 56 adjusts PRN coders to predictable offsets given by the following Equations or a variation thereof, to correlate simultaneously the GPS satellite PRN code signals received from each of the "M" satellites 52 in view in order to simultaneously detect the presence of all of the signals at some probable grid point location.

Figure 3:
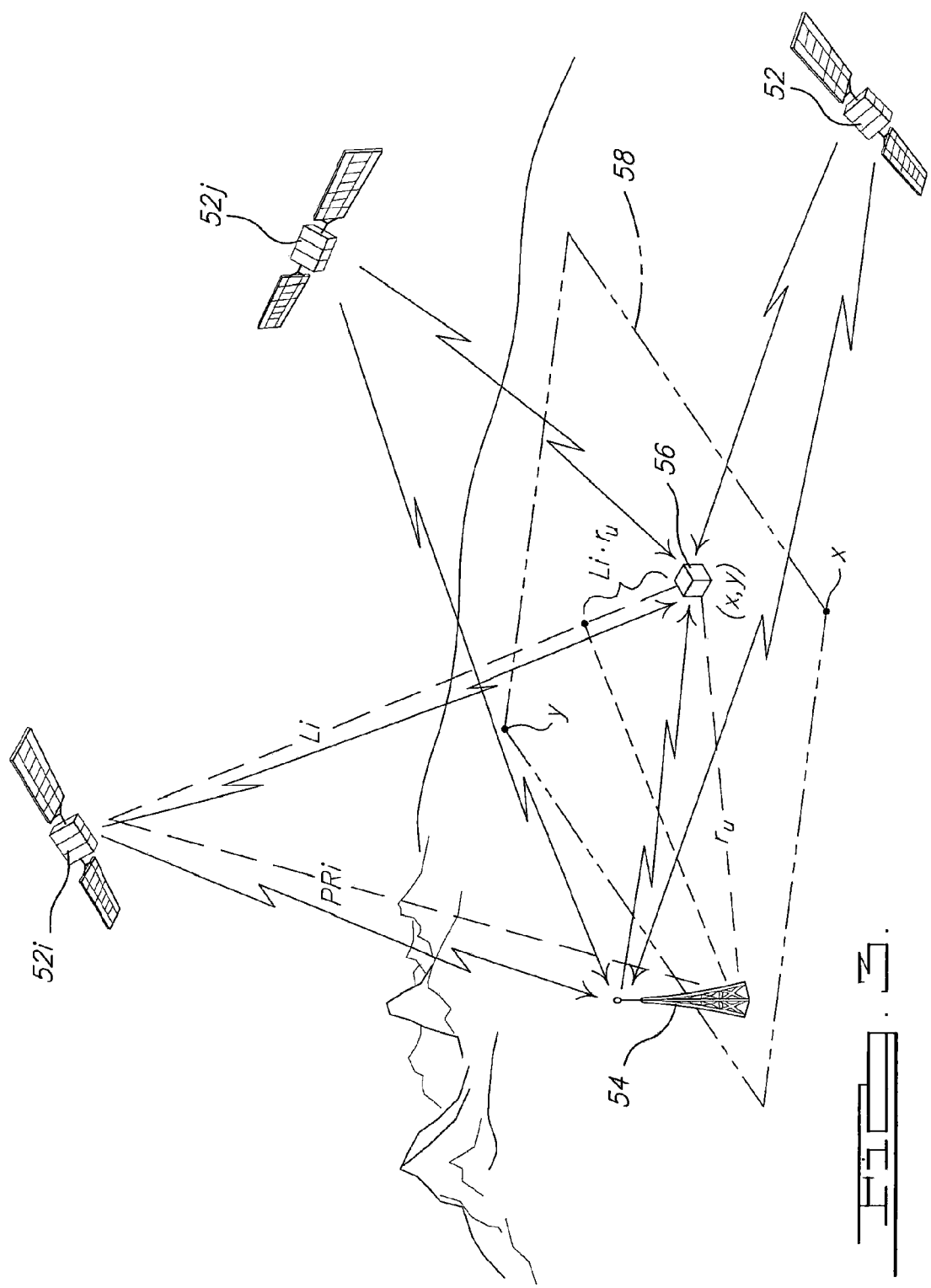
FIG. 3 is a graph illustrating an example of a two-dimensional search area region used to acquire simultaneously the ranging signal inputs from all of the satellites.

Referring to FIG. 3, the search space region 58 includes a set of search space grid points (x, y) that can be spaced about ¼ to ½ PRN code chip apart (a L1 C/A code chip corresponds to about 300 meters for C/A code and a P code chip corresponds to about 30 meters for P(Y) code). If the dimensions of the two-dimensional search space region are about 10 km×10 km, then the number of search points can be about 5,000 to 20,000 for C/A code chips. Additionally, reduction in the initial search space region enables significant computational savings. For example, a 1 km×1 km region allows a factor of 100 savings, or only 50 to 200 grid points for C/A code chips.

Again referring to FIG. 3, the received code phases at the location of the user receiver 56 which are offset by a vector $\vec{r}_U$ from the base station 54 will include a range offset relative to the base station 54 of magnitude $\hat{L}i \circ \vec{r}_U$, where $\hat{L}i$ is the Line-Of-Sight (LOS) unit vector to satellite "i". Thus, the set of "N" satellite PRN code pseudo range (PR) measurements received by the user receiver 56 relative to the base station 54 at epoch time to is given by:

$$\hat{L}i \circ \vec{r}_U + b = (PRi)_U - (PRi)_{BS}, i=1, 2, \ldots, N \quad \text{(Equation 1)}$$

where "b" is an unknown parameter that represents an unknown offset in a user receiver clock relative to the GPS time. "N" consists of all of the PRN code signals used in the processing summed from up to "M" satellites 52 in view. The relative code phase between two GPS PRN code signals "i" and "j" at epoch time to is defined as the following:

$$\Phi^{ij}(to) = PRi(to) - PRj(to) \quad \text{(Equation 2)}$$

where the PRN code ranging measurements i and j may be obtained from two different PRN code signals related to the same satellite 52i or two different PRN code signals obtained from two different satellites 52i, 52j. The relative code phase between two PRN code signals from the same satellite 52 will be almost identical. If the PRN code signals are obtained from two different frequencies from the same satellite 52i, the relative code phase may include an inter-frequency bias associated with the satellite transmitter and ionospheric delay.

The difference between relative code phases as seen by the user receiver 56 and the base station 54 is given by:

$$\Delta\Phi ij(to) = (\Phi ij)_U - (\Phi ij)_{BS} \quad \text{(Equation 3)}$$

Substituting Equation 2 into Equation 3 and using Equation 1 to simplify the results gives:

$$\Delta\Phi ij(to) = \{\hat{L}i(to) - \hat{L}j(to)\} \circ \vec{r}_U \quad \text{(Equation 4)}$$

The unknown user clock offset parameter "b" drops out of the differential relative code phase expression given by Equation 4. The Equations above, or a variation thereof, are used to predict the relative code phases within the user receiver 56, as the user receiver 56 simultaneously searches, acquires and combines the power from "N" GPS PRN code signals in view for the "M" satellites 52. This enables the user receiver 56 to acquire simultaneously "N" PRN codes up to all of the PRN codes for satellites in view of the user receiver 56. This is accomplished by using N correlators of the user receiver 56 and synchronizing corresponding N PRN code generator outputs chip sequences to phase offsets as given by the relative code phases predicted at a grid point at an epoch time. For example, consider the use of Equation (1) to predict the PR as received at the user receiver at a grid point, where it is assumed that the base station PR code measurement data, search region boundary data to limit the search for user location $\vec{r}_U$, and time synch function to limit the uncertainty of "b" are provided to the user receiver by the base station.

The LOS unit vector $\hat{L}i$ can be computed within the user receiver 56 using the almanac or ephemeris data of each of the satellites 52, base station location, and GPS time information, as provided by the base station 54. The LOS unit vector is typically assumed to be the same at both the base station 54 and the user receiver 56. Thus, for practical applications, the timing error between the base station 54 and the user receiver 56 should not exceed about 1 millisecond. A much smaller time synch error, however, is beneficial for reducing the search space associated with receiver clock error. Ideally, the time synch function provided by the base station 54 is accurate to one microsecond or less. This error, however, will also be limited by the size of the search space region 58.

Once the aiding data is sent to the user receiver 56, the user receiver 56 uses the above equations, or a variation thereof, to solve for the unknown parameter of the user receiver location relative to the base station 54 for the two-dimensional solution $\vec{r}_U=(X,Y)$ for the two-dimensional search space. Alternatively, if the search space region 58 comprises the three-dimensional earth-referenced grid, a three-dimensional solution $\vec{r}_U=(X,Y,Z)$ is provided.

Alternatively, a variation of the above Equations allows determination of an absolute user receiver location (e.g. a location of the user receiver 56 relative to an Earth reference centered coordinate system, instead of the base station 54) within the search space region 58. This absolute location can be obtained by adjusting the N correlators by using the relative code phases at each grid point, as predicted from the satellite ephemeris and clock data, and GPS time synch information supplied from the base station 54, within the processing method of the user receiver 56. However, this method may further require compensation for the ionospheric delay, which may be a sizable fraction of a code chip.

With static conditions over a small time interval, or with frequency and Inertial Measurement Unit (IMU) aiding, the user receiver 56 may also coherently process multiple measurements over an extended interval of time. In such a formulation, other parameters can be added to improve performance. The GPS processing adjusts the PRN coder and signal phase for any change in the satellite motion over the time interval relative to the GPS epoch time $t_0$. This adjustment can be determined using the satellite ephemeris and clock data.

In order to coherently combine all PRN code signals at the user receiver location, the user receiver 56 performs a combinatorial search over all of the signal carrier phase angle possibilities associated with each PRN code at an initial measurement epoch time. The combinatorial search extends over all of the carriers phase combinations associated with the "N" PRN codes processed. That one carrier phase angle combination, grid point and user receiver clock combination that produces the strongest "spike" in the combined PRN code signal power output relative to noise level, e.g. a summed output from the "N" PRN code correlators that perform a slaved, relative code phase synchronized search as described above, indicates the most probable user receiver location. This search also includes a search over user clock error and a combinatorial search over all carrier phase combinations for all PRN code signals at each grid point. Additional information, such as knowledge of nominal code received power level, estimated noise level in each frequency band, satellite LOS attenuation due to the user receiver's 56 antenna gain pattern relative to an attitude reference, and known LOS obstructions may be useful for eliminating signals and reducing the number of combinations, or weighing the power outputs to improve solution speed or performance. This information can also enable calculation of a suitable threshold to predict the reliability of computed solution operation performed by the user receiver 56.

The user receiver 56 may perform the combinatorial carrier phase search by applying a digital rotation of the sampled signal phase at epoch time $t_0$ for each PRN code signal prior to correlation. For example, an exhaustive search using 45 degree phase increments for five PRN code signals corresponds to $8^5=32,768$ possible combinations. The search may be efficiently synthesized using specially designed electronic circuits (e.g. Application Specific Integrated Circuits or "ASICs"). Such circuits can implement large numbers of correlators for quickly searching for maximum combined power over the entire search space. Additionally, the use of smaller carrier phase increments will reduce signal processing losses, but also causes an increase in computational burden or electronics hardware complexity. A reduction in carrier phase combination search space is possible using known signal phase relationships for each satellite 52, or by having the base station transmit to the user receiver 56 the relative carrier phase angle information between each satellite 52 PRN codes as measured.

At each grid point within the search space region, the user receiver 56 assumes that this particular grid search point is the probable location of the user receiver 56. During the processing, the user receiver 56 adjusts each internal PRN coder phase to an associated relative code phase as predicted by the Equations above. Additionally, the user receiver 56 correlates output data of the aforementioned, associated PRN coder with down-converted and frequency corrected data received from the user receiver 56 GPS antenna. If the user clock time offset and range offset associated with the predicted code phase and the search space grid point corresponds to the actual user receiver range, there will be a power output corresponding to signal presence. If the presumed assumption is incorrect, the power output will correspond to only noise. In challenging environments (e.g. in-doors or under interference conditions), the power output from one correlator may be insufficient to reliably detect the PRN code signal. When the power output from the "N" PRN code signals is coherently combined, the reliability of the detection of the PRN code signals are much improved. By coherently combining the correlator outputs from each of the received GPS satellite ranging signals, the PRN code signals can all be acquired simultaneously at the probable user receiver location.

Following an initial search of the PRN code signals, detection of the PRN codes signals, and determination of the probable location of the user receiver 56, a subsequent refining search for the location of the user receiver location may be performed. Such refinement may involve adjusting the reduced search space region 58 in smaller grid steps (e.g. 1/10 code chip spacing) relative to an initial grid point solution until the power is further maximized, or by using small code phase adjustments to implement code phase error processing.

For the base station 54 and the user receiver 56 processing of data associated with multiple frequency bands, the inter-frequency bias for the base station 54 and the user receiver 56 is kept small relative to a code chip (C/A code chip is about 1 microsecond, and P(Y) code chip is about 0.1 microsecond). Alternatively, an additional small search layer associated with this bias may be necessary if coherent combining of all signals from all frequency bands is desired. However, significant processing gain may be achieved by only processing PRN code signals from one frequency band. For example, each satellite 52 may have two civil and two military signals on the Earth coverage L1 frequency, so that ten satellites 52 in view could deliver a factor of 40 (16 dB) advantage over the acquisition of one signal only, assuming satellite PRN code signals of comparable received power levels.

Without a high-quality, accurate and stable user receiver 56 oscillator or the base station frequency aiding as described above, an additional search over the user receiver oscillator frequency offset may also be needed, and coherent integration time duration may be limited. In this case, the extent of the additional frequency search space will depend on the frequency error of the oscillator, and the duration of the coherent integration time will depend on the stability of the oscillator.

To extend coherent integration time for each PRN code, the processing includes frequency correction for a satellite 52 Doppler relative to the user receiver 56 and incremental corrections for change in Doppler relative to the epoch time. For example, for long integration times, in order to maintain phase coherency over the correlation interval, the captured GPS signal sample data or internally generated code and carrier phase data is also phase corrected for any satellite 52 or significant user receiver 56 motion over the correlation interval. On the other hand, an operator on foot can eliminate the user receiver motion degradation by simply holding the user receiver 56 still for a few seconds after pushing a button associated with the user receiver 56 while the broadcast GPS signal data is captured. Additionally, correction for the user receiver 56 differential Earth rotation affects is not necessary for search area regions within 10 km×10 km.

In another embodiment of the user receiver 56, the user receiver 56 can employ a method for weak signal recovery. The user receiver 56 employs a weak signal recovery method during weak signal environments and/or jamming conditions such as when only one to two strong satellite ranging signals can be detected and acquired. The user receiver 56 or base station 54 identifies the received satellite ranging signals as strong signals or weak signals. The user receiver 56 determines whether a number of the strong signals equal less than a predetermined number of strong signals. The predetermined number of strong signals represent that number of strong signals needed by the user receiver 56 to determine its probable location, based on processing measured pseudoranges. The carrier phase angle combinations are constrained to measured quantities associated with the strong signals. The user receiver 56 searches through the weak signals using a constrained search space region based on data related to the strong signals. Searching only over the weak signal carrier angle offsets, the user receiver 56 searches over the search space region to determine its probable location.

In another embodiment of the user receiver 56, the user receiver 56 may employ image geometric surface processing techniques to more accurately determine the probable location. Using the image processing techniques, the user receiver 56 analyzes a geometric surface pattern of the combined power outputs over the search grid points. The geometric surface may include a surface over the search grid having the combined power value at each grid point location. The image processing techniques can be applied to compute a smoothed geometric surface model fit to the raw geometric surface power data to further refine a location of a maximum peak or maximum combined power output, and further analyze the geometric surface to determine if a peak actually corresponds to a false detection or correct detection. The geometric surface model fit may be analyzed by extracting and analyzing discrimination parameters. At a correct user receiver location, the geometric surface exhibits the characteristics of a maximum power peak. Discrimination parameters extracted from the smoothed surface model fit and residual noise jitter relative to the smoothed surface model fit can be analyzed to enhance the confidence of a probable solution or to identify and exclude a false solution.

More specifically, the user receiver 56 adjusts the user clock time offset to maximize each of the combined power outputs corresponding to each grid point location. Next, a geometric surface model is predicted over the resulting search space region based on predicted geometry and signal characteristics of each received satellite ranging signal. A further discussion of the prediction of the geometric surface model will follow. Finally, the parameters of this geometric surface model are fit (e.g. in a Least Squares sense) to the noisy combined power values associated with the grid points. Analysis techniques are applied to the geometric surface model and derived discrimination parameters to allow an enhanced detection of the maximum power output and characterization of the power surface to determine the reliability of the probable user location solution.

In applying the image processing techniques, the user receiver 56 can also process multiple snap shots of the geometric surfaces over several time intervals. Next, the combined power outputs of the network of slaved correlators or the smoothed geometric surface models are filtered over time to produce time-smooth combined outputs. The processing method thus applies filtering or smoothing of the combined power data over a 2-dimensional (or 3-D) space and time. The smoothed geometric surface models are interpolated to better locate the maximum power output at a particular grid point location that corresponds to the probable location. Next, slopes, peaks and ridges of the geometric surface are used in order to generate discrimination parameters. The discrimination parameters are analyzed to confirm that the probable location corresponds to a maximum peak having the ridges that triangulate to that probable location. Smart algorithms can be applied for this application. Once the maximum peak has been located, the geometric surface and the peak may be evolved and tracked in time in a Kalman filter type of processing which include geometric surface dynamic models, and the processing of measurements at multiple time epochs from the base station 54.

The geometric surface evolves in a predictable fashion based on an assumption that the user receiver 56 is located at the probable location in the search space region, a valid user receiver motion model, being provided with the signal characteristics and known geometry of the satellites relative to the user receiver 56. As time evolves, this geometric surface will change slightly due to satellite motion relative to user receiver motion, but this effect is predictable. Even more, as new satellites are added to the processing and other satellites are deleted, the evolution of the geometric surface is predictable.

This suggests the use of predictive geometric surface image models that evolve with time, but that also include some random time-evolving component to adapt to fading and other random effects. Such a random evolving component may involve random field models and Kalman filter type dynamics models to smooth out the noise both spatially and temporally, to thus enhance the navigation solution accuracy associated with tracking the maximum peak power.

In another embodiment of the user receiver 56, the user receiver 56 can incorporate a priori or received information in the signal processing logic to add further benefits to enhance processing. For example, a priori information may include data related to GPS PRN code received power, data related to interference in each frequency band, known LOS obstructions, antenna gain pattern and attitude reference data. The signal strength of GPS PRN code can be used to preferentially process stronger signals. The interference can be used to preferentially process PRN codes from frequency bands with the lowest interference. The attitude reference data can be used to exclude weaker signals such as those associated with low user receiver antenna gain. IMU information or motion detectors can be used to set appropriate coherent integration intervals for each signal. Processing logic control can be implemented using smart algorithms.

Another embodiment of the user receiver 56 includes the user receiver 56 using an ultra-tight coupling (UTC) technique. The UTC technique is an effective way of improving ant-jamming conditions by integrating raw GPS measurements with raw inertial measurement unit (IMU) measurements. With the UTC technique, a smoother (not shown) transforms and smoothes the power outputs of the network of slaved correlators into range and range rate residual errors, or position-time domain and corresponding rate residual errors. The smoother may comprise the Kalman filter.

For example, the traditional UTC technique assumes initial acquisition and locks on to the GPS signals in a benign environment prior to tracking of all of the GPS signals in view in the position-time domain. The user receiver 56 may initialize the UTC technique in a position-time domain track in high-jamming environments. One example of this includes when a Precision Guided Munition (PGM) is released and must obtain a GPS signal acquisition and a fix or "track" in a stressed environment. Since in the UTC technique all of the satellite PRN code measurements are closed-loop tracked through the Kalman filter, conventional indicators of positive track conditions associated with individual PRN code or carrier tracking loop error jitter may no longer apply. For geometric surface processing, a converged UTC technique position-time domain solution can be perturbed to verify that the UTC technique solution actually corresponds to a maximum power peak. The image processing analysis techniques may be applied in the vicinity of the converged UTC technique solution to establish the presence or absence of a maximum power peak output. The integrity or reliability of the UTC technique solution aids in determining whether the GPS measurements should be integrated into the INS solution. If the GPS signal track condition is positive, then the GPS measurements should be integrated into the INS solution. On the other hand, if the GPS signal track condition is indeterminate or negative, the GPS measurements should be discarded. In this case, the user receiver 56 will only use the INS solution.

Figure 4:
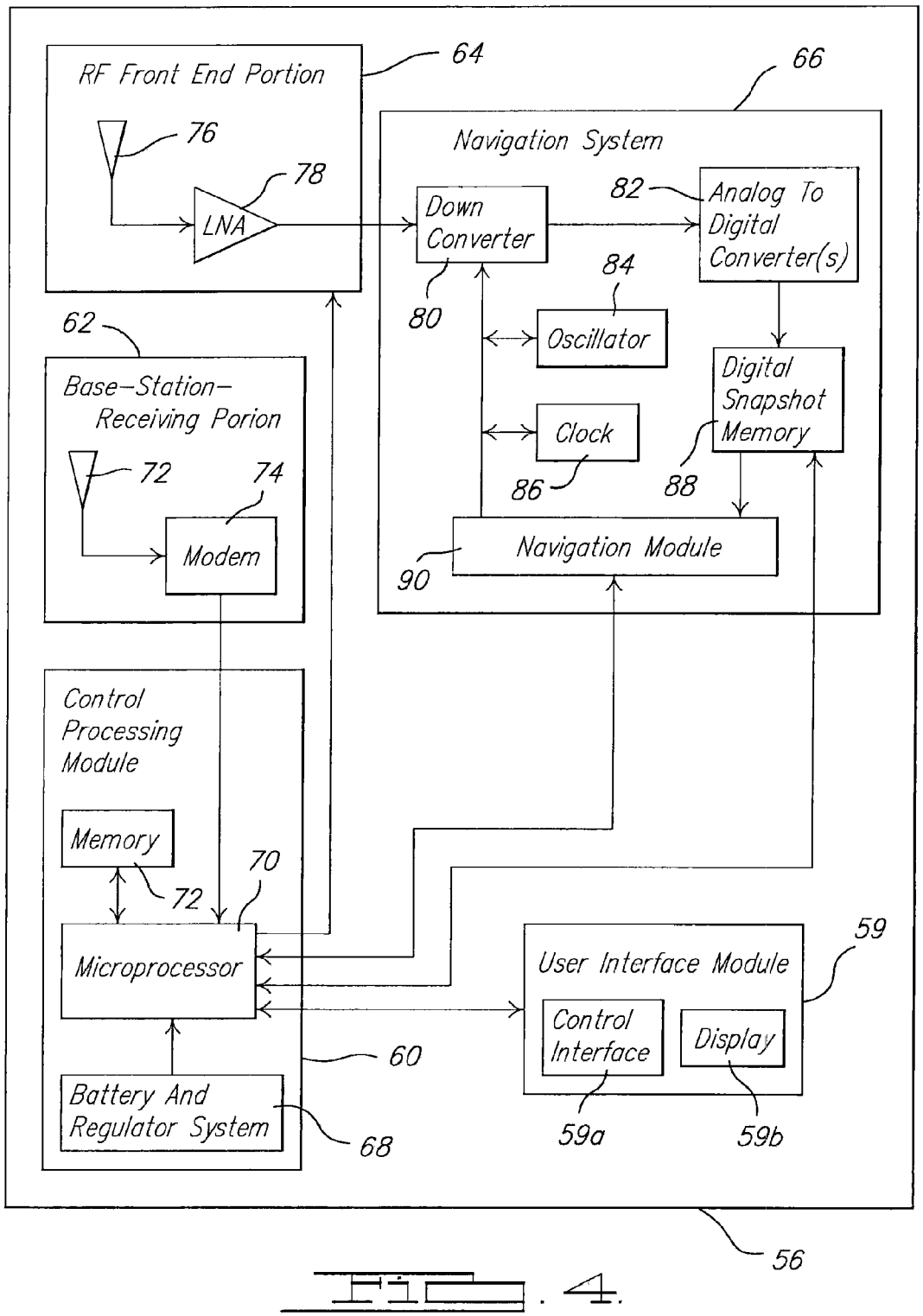
FIG. 4 is a block diagram of an exemplary user receiver according to the disclosure contained herein.

Referring to FIG. 4, one embodiment of the user receiver 56 is shown. The user receiver 56 can include a user interface module 59, control processing module (CPM 60) 60, a base-station-receiving portion 62, a radio frequency (RF) front end portion 64 and a navigation system 66. The user interface module 58 allows a user to send a request signal for the determination of the probable location of the user receiver 56 to the CPM 60. The CPM 60 controls data transfer and power management as well as analyzes the power outputs transmitted by the navigation system 66 to predict the probable location. The base-station-receiving portion 62 receives data information from the base station 54 and transmits it to the CPM 60. The RF front end portion 64 receives the GPS signals from the satellites in view of the user receiver 56. The navigation system 66 processes the GPS satellite signals, via the RF front end portion 64, based on the data received from the base-station-receiving portion 62 as described herein to determine the probable location of the user receiver 56.

The user interface module 59 may include a control interface 59a and a display 59b. Using the control interface 59a, an operator may send a request signal to the CPM 60 to start processing GPS signals to determine the probable location of the user receiver 56. The control interface 59a may also send a request to the CPM 60 for one of a plurality of modes for operation to be implemented. The modes of operation will be further discussed later. Once the probable location is determined, the display 59b may receive the signal indicating the probable location and notify the operator thereof. More specifically, the display may display the probable location such as via a conventional LCD display panel.

The CPM 60 receives the request signal from the user interface module 59, the base-station data from the base-station-receiving portion 62 and the power outputs from the navigation system 66. The CPM 60 can include a battery and power regulator system 68, a microprocessor 70 and a memory 72. The battery and power regulator system 68 provides regulated power to turn ON each of the RF front end portion 64, the CPM 60, the Navigation System and the user interface module 58.

The microprocessor 70 may store the base-station data transmitted by the RF front end portion 64 in the memory 72. The microprocessor 70 handles data information transfer between each user receiver processing elements and the modem. The microprocessor 70 also activates the RF front end portion 64 and the navigation system 66 such that the probable location of the user receiver 56 is determined once the request signal is received. Additionally, the microprocessor 70 processes the power outputs of the navigation system 66 to determine the probable location, which then may be stored in the memory 72. The microprocessor 70 may further conduct other functions disclosed herein, such as the geometric surface imaging processing techniques and the UTC technique. Additionally, to save power, the microprocessor 70 may set most or all of the user receiver's hardware to a low power condition, commonly called "Standby" mode, or a power down/"OFF" state, when the pseudorange and/or other GPS calculations are not being performed. The memory 72 is used to store data sent by the microprocessor 70 as disclosed above. Likewise, the memory 72 may also store predicted data by the navigation system 66 and/or related GPS signal data.

The base-station-receiving portion 62 may comprise a first antenna 72 and a modem 74. The first antenna 72 receives the base station data including the aiding data, the set of initialization data and base-station-location data transmitted by the base station 54. This data is received by the modem 74 and transmitted to the CPM 60.

The RF front end portion 64 may comprise a GPS antenna 76 and a low noise amplifier (LNA) 78. The GPS antenna 76 receives the GPS signals from each satellite in view of the user receiver 56. The LNA 78 may include a conventional RF filter (not shown), a conventional low noise amplifier stage (not shown) and a conventional buffer amplifier stage (not shown). The RF filter rejects signals related to co-located cellular radio, MSAT and Inmarsat transmitters, as well as rejection of image and sub-harmonic frequency signals. Each of the low noise amplifier stage and the buffer amplifier stage use amplified received signals to maximize reliability.

The navigation system 66 may be a weak signal lock system, an anti-jamming system, or a combination thereof. The navigation system 66 includes a down converter 80, an analog-to-digital (A/D) converter 82, a reference oscillator 84, a clock 86, a digital snapshot memory 88 and a navigation module 90. When the navigation system 66 is activated, the down converter 80, the A/D converter 82, the digital snapshot memory 88, and the navigation module 90 may be fully powered via the battery and power regulator system 68 of the CPM 60. This enables each signal from each GPS satellite to be received via the GPS antenna 76 and pre-processed for storage in the Digital Snapshot memory 88. The received signal is filtered and amplified by the LNA 78, and down converted to an IF frequency by the down converter 80 using the reference oscillator 84. The reference oscillator 84 provides an internal frequency reference, digitized by the A/D converter 82 and stored in the digital snapshot memory 88. The navigation module 90 retrieves the data from the snapshot memory 88 and combines this data with the information received from the base-station-receiving portion 62 to determine the probable location of the user receiver 56. Upon receipt of the base station information, the navigation module 90 may update and synch the clock 86 and correct the oscillator 84 frequency as indicated above. The oscillator 84 functions as the user receiver oscillator 84 as disclosed herein. Additionally, the clock 86 functions as the user receiver oscillator clock 84 as disclosed herein.

Referring to FIGS. 4-5, the navigation module 90 includes an outer loop search routine 92 and an inner loop search routine 94, and a network bank of slaved correlators 96. The outer loop search routine 92 conducts the search over the search space region set of grid points bounding the probable location, over time increments in an interval bounding the user clock error. At each grid point and user receiver time offset, the inner loop search function 94 performs a search over all initial carrier phase angle combinations and causes the network of slaved correlators 96 to compute a power quantity associated with the combined received PRN code signals. Since the received code phases at each grid point and epoch time are predictable relative to the base station supplied ranging measurements, a plurality of correlators are slaved together to perform the combination search. The network of slaved correlators 96 attempts to coherently combine all of the PRN code signals at each grid point and time offset point by performing the combinatorial search over all possible initial carrier phase angle combinations at epoch time to. Alternatively, the network of slaved correlators 96 may be replaced by a Fast Fourier Transform (FFT) implementation.

At each grid point, the inner loop search function 94 searches over all possible initial carrier phase angle combinations for the N independent signals processed. For some PRN code signals, the phase angle relationship between multiple signals from the same satellite can be predicted or provided by the base station 54. This information can be used to reduce the combinatorial search space, e.g. L1 C/A code and P(Y) code, when these two codes are nominally in phase quadrature. The user receiver clock offset represents another search parameter. At a correct grid point location, user time and carrier phase angle combination, all of the correlator signal power outputs will be coherently combined in-phase and there will be a strong spike in the combined power output from network 96 relative to the noise level.

Additionally, the network bank of slaved correlators 96 preferably comprises an ASIC. For example, the network bank of slaved correlators 96 may be implemented in a 100 MHz ASIC. In addition, preferably many parallel replicas of the network bank of slaved correlators 96 may be implemented to quickly search through all of the grid point locations in the search space region and phase angle combinations. For example, the ASIC may incorporate 10,000 or more of the network bank of slaved correlators 96 to simultaneously search through 10,000 or more grid point or carrier phase angle combinations in parallel. The network bank of slaved correlators 96 may search each carrier phase angle in 45 degree increments (smaller increments would reduce the combining losses, but increase the processing load). Thus, each signal carrier phase angle may be searched in eight increments over the span of 360 degrees. The total number of unique carrier phase angle combinations for N independent signals is then $8^N$.

The following discussion in connection with FIG. 6, describes the functionality of the network bank of slaved correlators 96 in further detail. A conventional PRN code stripping is performed by each Correlator and data stripping function (not shown) removes any modulation associated with the PRN code and the Nav message data bit transition if applicable. As the PRN code signal is received at a first mixer 98, the user receiver oscillator frequency correction is provided as derived by the aiding data sent by the base station 54, and is applied. At a second mixer 100, the PRN carrier phase angle associated with a particular increment of the inner loop 94 search of FIG. 5 is removed. At a third mixer 102, predictable satellite orbit and clock Doppler at the epoch time are mixed. Predictable adjustments to code phase and carrier phase due to satellite orbit and clock motion over the correlation interval can also be applied at the PRN coder and at the second mixer 100, respectively. In a likewise fashion, additional code and carrier phase corrections for the user receiver Doppler at epoch time and motion over the correlation interval can be applied if available from an IMU. Otherwise, if the user receiver motion is negligible, then static aiding by the operator or motion detection sensor can be employed. Given the PRN code phase data as received at the base station 54, the relative code phases at a particular grid point location at epoch time is predicted. This allows each PRN coder 104 associated with a particular correlator 106, which feed the particular correlator, to be slewed to predictable code phase offsets. Additionally, a predictable "user-satellite dynamics adjust" signal over the correlation interval can be input to steer the PRN coder 104 and compensate for satellite orbit and clock motion (and user motion if available from an IMU) over the correlation interval. This allows the carrier phase mixer 100 adjustments relative to epoch time and code phase adjustments relative to epoch time at the PRN coder 104 to continue slewing as time varies to maintain coherency of both the code and the carrier over the entire coherent integration time interval.

The equation for this compensation in the range domain is:

$$\Delta PR(t) = \int_{t_o}^{\tau} \frac{dPR}{dt} dt,$$

where the rate of change in pseudorange is given by the satellite ephemeris data and clock data and user receiver motion knowledge, if available from an IMU. In theory, when all of the aiding processes are functioning properly, the processing can enable coherent integration times on the order of one-second, and processing gain approaching 10×log(N) relative to the processing of one PRN code signal.

Figure 7:
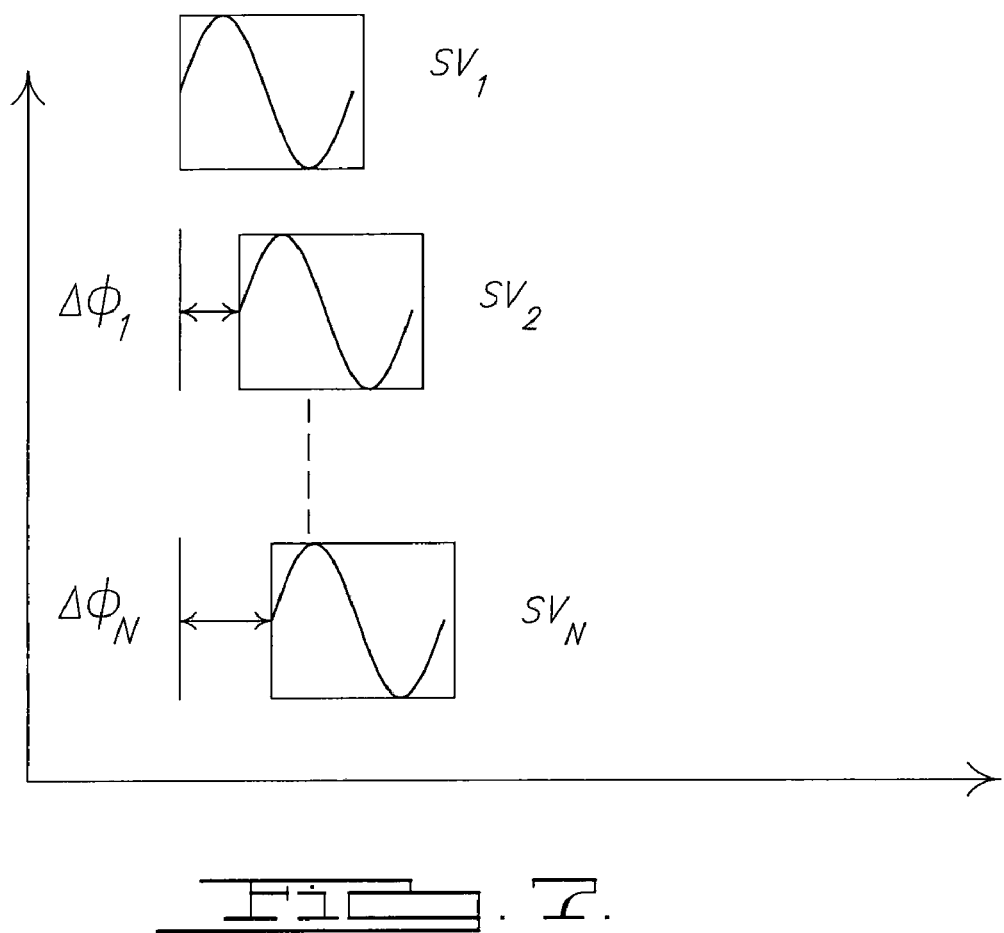
FIG. 7 is a graph illustrating phase shifts of coherently combining of multiple satellite signals in accordance with the disclosure discussed herein.

In order to coherently combine all the ranging signals from multiple satellites, all of the signals must be processed in-phase. The navigation module 90 searches through all possible carrier phase angle combinations and adjusts the signal phase during the processing. At the correct grid point, user receiver clock 86 offset and carrier phase angle combination, the power for all of the signals will be coherently combined. For example, assuming the received GPS signal phases, as shown in FIG. 7, that one phase angle search combination most closely corresponding to $\Delta\phi_0=0, \Delta\phi_1=-\Delta\phi_1, \ldots, \Delta\phi_N=-\Delta\phi_N$, will cause all signals to be in phase when coherently combined. The coherent combining of all of the correlator outputs occurs when the outputs from each of the correlators 106 are combined at a combiner (e.g. summer) 110.

A discussion of the SNR ratio and processing gain for the method 10 and the system 50 will now be presented. Let Y be the combined correlator output 110, in this case assuming the combination function corresponds to a simple sum of the N correlator outputs, and let $s_i$ and $n_i$ be the signal and noise outputs from each correlator 106, respectively. The noise outputs are assumed to be zero mean and independent and identically distributed (IID).

$$Y = \sum_{i=1}^{N} (s_i + n_i)$$

At the correct grid point, user receiver clock offset, and carrier phase angle combination, the variance of Y is given by:

$$\sigma_Y^2 = E\{Y^2\} = E\left\{\sum (s_i + n_i) \circ \sum (s_i + n_i)\right\}$$
$$= E\left\{\sum_i \sum_j (s_i + n_i) \cdot (s_j + n_j)\right\}$$
$$= E\left\{\sum_i \sum_j s_i \cdot s_j\right\} + E\left\{\sum_i \sum_j (s_i n_j + s_j n_i)\right\} +$$
$$E\left\{\sum_i \sum_j n_i \cdot n_j\right\}$$
$$= N^2 \cdot |s|^2 + 0 + N \cdot \sigma_n^2$$

Considering the last line of the derivation shown above, the first term equals N squared times the power associated with each signal (since all of the signals are summed in-phased at the correct grid point, user clock offset, and carrier phase angle combination, and assuming all signals have the same amplitude or power). The middle term equals zero because of the noise zero mean property. The third term equals N times the variance of each noise term since only the i=j case survives the double summation due to the IID uncorrelated property.

The processing gain relative to a single correlator is given by the ratio of a first term to a last term, i.e. $N^2/N$ times the SNR of a single correlator or a factor of N gain relative to the gain of a single correlator 106 which processes a single PRN code signal. Therefore, for N=10 PRN code signals, the processing gain is 10 dB, and for N=100 PRN code signals, the processing gain is 20 dB. This assumes no losses occurred during the combining of the power outputs of the network bank of slaved correlators 96. In actual practice in some environments, one or more signals may be totally blocked, and the corresponding correlator power outputs will only add noise to the combined output.

The process of combining the satellite signal can take a more general form than a simple summation, e.g. a weighted summation of each correlator output as given by:

$$P = a_1 \cdot P_1 + a_2 \cdot P_2 + \ldots + a_N \cdot P_N$$

Selection of combining weights $a_i$ to enhance performance as a function of predicted signal strength, as well as optimal coherent integration times for each PRN code signal processed based on uncertainty in motion along the LOS, enables control of additional degree-of-freedom parameters for enhancing performance. The combining weights $a_i$ can even serve as parameters used to fit a predictive geometric surface model associated with zero noise to the noisy raw summed power output data over the search space grid region.

In addition, the elapsed time to complete the search may not exceed a few seconds. Processing load estimates are thus provided for an assumed user receiver architecture implementation. However, technology under development may significantly facilitate the processing in the future, for example the Defense Advanced Research Projects Agency Micro-electro-mechanical Systems (DARPA MEMS) scale atomic clock project.

Still in another embodiment, the user receiver 56 may implement a modified processing to 92 in which both the PRN code phase and the carrier phase angle offset are predicted. When searching in the three dimensional search space region, the search space region can be divided into a finer resolution grid spacing to increase a number of the grid point locations. This may allow the user receiver 56 to more accurately predict its carrier phase angle at a probable location. For example, the three-dimensional search space region may comprise less than or about 100 meters cubed. Additionally, the finer resolution, for example, may comprise a fraction of a carrier wavelength or about 1-3 centimeters.

If the base station wireless-assist service also provides its carrier phase angle measurements at the GPS epoch time, the user receiver 56 can use this information to predict its own carrier phase measurements at each grid point in the search space region having the finer resolution grid. Here, the user receiver 56 may not search over the carrier phase angle combinations. Instead, at each grid point, the code phase measurements and the carrier phase measurements relative to the base station 54 would be predicted using the base station range and phase angle measurements. Additionally, whereas ten or less independent satellite signals may be processed at each grid point location using the prior method including the search over all carrier phase angle combinations, since the combination search space grows to the $N^{th}$ power, the modified processing can enable many more signals to be processed. The user receiver clock offset is also adjusted to maximize the combined power outputs of the network bank of slaved correlators 96, where the maximum power output indicates the probable location of the user receiver 56. The advantage of this modified carrier phase prediction processing is that the processing load will depend on the size of the uncertainty region and the processing can thus extend to many more independent satellite signals, e.g. potentially up to 100 or possibly greater satellite ranging signals in view when Galileo and Modernized GPS satellites are eventually deployed, for a processing gain up to 20 dB relative to one PRN code signal.

In another embodiment, the method 10 and the system 50 may determine the probable location of the user receiver 56 without wireless aiding from the base station 54. In this embodiment, the user receiver 56 may operate in any one of "Hot Start", "Subsequent Fix" or "Reacquisition" modes of operation. A user receiver 56 that contains no stored aiding data and/or satellite signal data is generally called a "cold" receiver. The Hot Start mode allows the user receiver 56 to determine its probable location by receiving the aiding data from a second user receiver (not shown). A user receiver 56 that has processed satellite ranging signal and determined its probable location often called a "hot" receiver. The second user receiver may comprise any GPS processing device, a cell phone station, or a communications satellite that also provides a time synch and geolocation service or a navigation signal-of-opportunity, e.g. synchronized RF signals from TV or radio stations. The second user device may also be derived from a suitably designed second GPS/wireless device within a local network of GPS/wireless devices.

In the Subsequent Fix or Reacquisition modes, the user receiver 56 automatically turns OFF the RF front-end portion 64, the base-station-receiving portion 62, the navigation system 66, and/or the user interface module 58 to save battery life. This in turn causes the user receiver 56 to stop processing the satellite ranging signals. After a short period of time, the above mentioned elements are automatically turned ON to quickly determine the probable location of the user receiver 56. This sequence of turning OFF and ON to determine probable locations of the user receiver 56 occurs based on a period of time. The primary benefit of this method is that the user receiver 56 may operate to obtain Subsequent Fixes without the further use of base station aiding information, but can instead utilize initialization data as predicted using internally saved data, PRN code phase data from its prior fix and time as maintained by its internal clock. An additional benefit from this sequence is that a breadcrumb trail may be generated and saved. The breadcrumb trail includes a plurality of saved consecutive probable locations determined over the period of time. The breadcrumb trail is determined based on using internally saved data from a prior probable location. Each mode of operation enhances the user receiver's 56 ability to operate under stressed conditions where other signal enhancements or anti-jam technology may fail.

In another embodiment of the method 10 and the system 50, GPS Nav data stripping may be applied, for example to extend the coherent integration time beyond the NAV message data bit transition boundary. To facilitate this data stripping, the user receiver 56 preferably samples at an appropriate time when the data bits can be predicted over a correlation interval. The base station 54 preferably provides the aiding and code phase information at approximately the same time.

In a further embodiment, if message data cannot be predicted and relayed to the user receiver 56 in advance of signal reception by the user receiver 56, the user receiver 56 can buffer the digitized data. The buffer can then wait for a feed forward of the NAV message data from the base station 54 wireless assist link, prior to processing.

In yet another embodiment, the user receiver 56 may coherently integrate information on dataless chips or channels, which are expected to be available on future modernized L2 and L5 civil and other signals.

It should be noted that reduced performance is possible along with reduced processing complexity, with short coherent integration time durations limited to one NAV data symbol interval. Reduced performance and reduced complexity are also possible, if the correlator power outputs are combined non-coherently, e.g. by squaring the power outputs from In-phase (I) and quadra-phase (Q) channels, and then summing $I^2+Q^2$ for all of the PRN code channels. In this implementation, the search over carrier phase angle combinations 94 can be avoided.

In a further embodiment, in challenging environments, repeated snapshot type of acquisition/position fixes may enable a robust acquisition/reacquisition and subsequent quasi-continuous time navigation capability in situations when continuous tracking of the GPS PRN code signals may fail. In less challenging environments, a hand-off of the above derived solution may be performed to initialize satellite PRN code and carrier signal tracking loops, or vector delay lock loop. A hand-off to an ultra-tight coupling implementation to continuously track all of the GPS satellite ranging signals in view, validate the solution, demodulate the Nav message data, and refine the position, time, and velocity estimates, may also be performed. In particular, this implementation also provides a robust technique to initialize ultra-tight GPS/INS (inertial navigation system) coupling implementations in interference prone environments.

Figure 8:
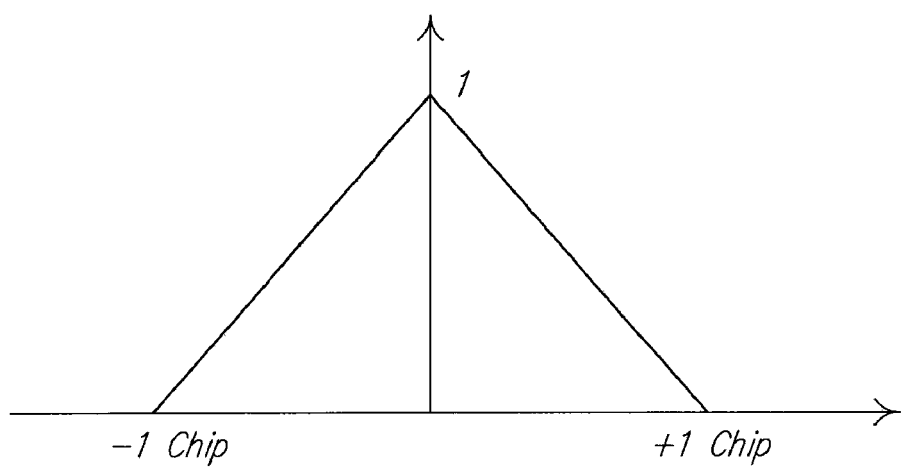
FIG. 8 is diagram of an ideal correlation function in accordance with the present disclosure.

The following examples illustrate the performance of the method 10 and the system 50. Additionally, each example presented includes MATLAB simulation results. The simulated "true" location of the user receiver 56 was taken at an arbitrary location in a 2-D (or 3-D) Earth referenced space region, and the code phase measurements were simulated at a base station location at an epoch time. The functions of the user receiver 56 were simulated. Referring to FIG. 8, an ideal correlation function was assumed. Due to the extreme amount of processing load required, the carrier phase angle processing as shown in FIGS. 5 and 6 was not simulated, and the PRN code signals were assumed to be combined without carrier phase angle losses. However, due to the finite search grid spacing, code correlation losses for code phase offsets from the correlation function peak were present.

For Example 1, assume 5 satellites and processing of the L1 C/A code (code chip=300 m) from these five satellites, and an initial 2-D position and time uncertainty region of 1 km, searched in ¼ chip increments. The assumed user equipment architecture consists of only one network bank of slaved correlators as shown in FIG. 6 and processing steps clocked at 100 MHz.

Number or grid-time points=$(1000 \text{ m}/75 \text{ m})^3$=2370

Number of carrier phase angle combinations=$8^5$=32,768

Total number of parallel search segments=(2370)*(32,768)=77.7 M

Total time to search assuming 100 MHz ASIC=77.7 M/100 MHz=0.78 sec

Processing gain relative to one PRN code signal=5 satellites (7.0 dB)

Figure 9:
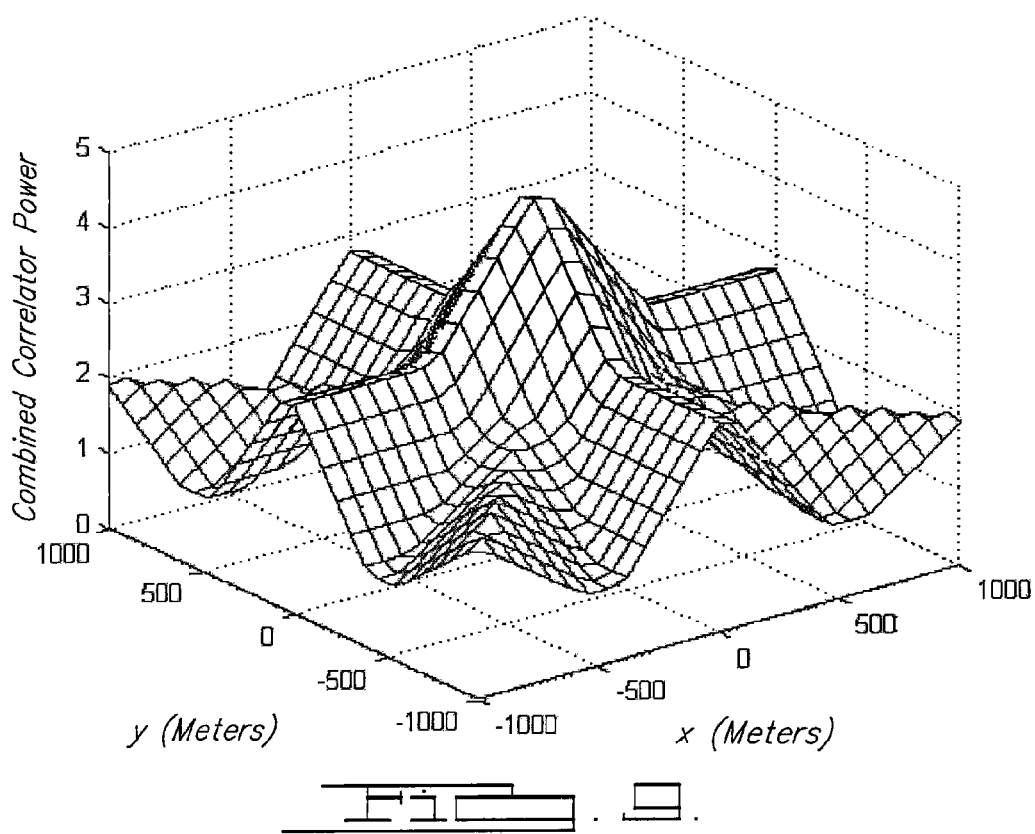
FIG. 9 is a graph illustrating power outputs over a 2-D search space region for a plurality of grid point locations (for a user receiver having five satellites in view and zero noise)
Figure 10:
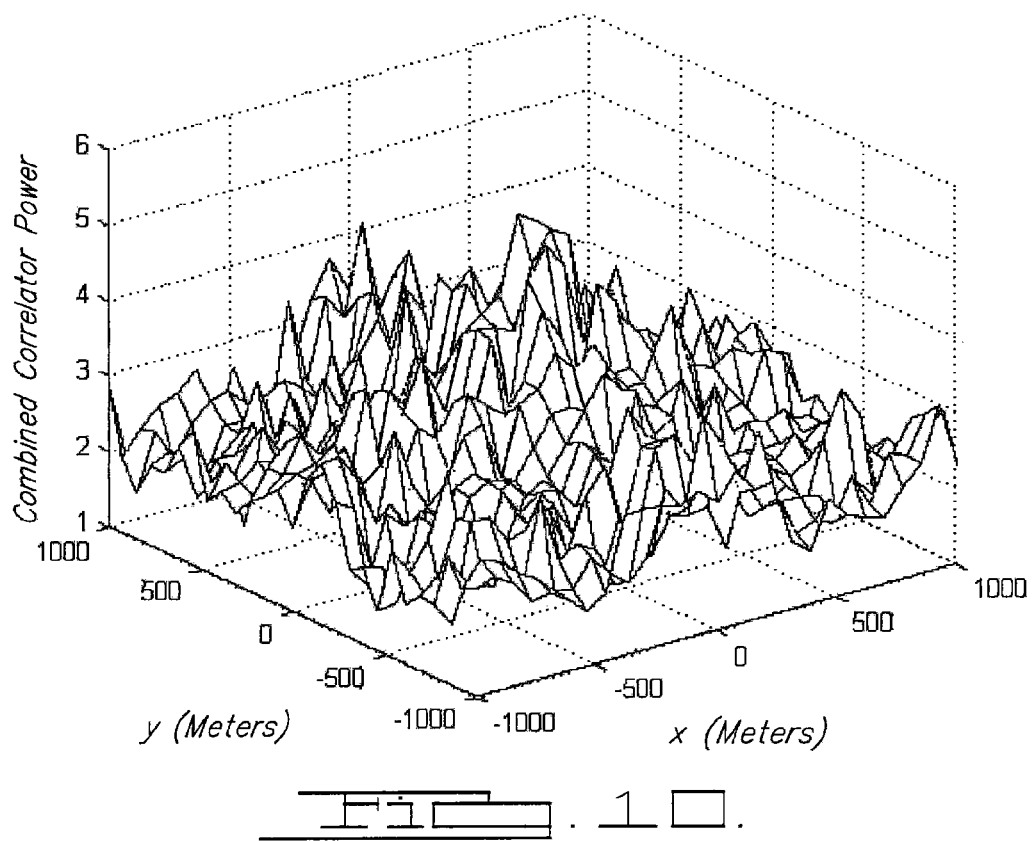
FIG. 10 is a graph illustrating power outputs over a 2-D search space region for a plurality of grid point locations (for a user receiver with five satellites in view and an SNR=12 dB for each PRN code correlator output)

As shown in FIGS. 9-10, the MATLAB simulation results are presented to illustrate the combined power surface for the N=5 satellite case in which one satellite was selected directly overhead at 90 degrees elevation. The remaining four satellites were chosen at an elevation angle of 45 degrees and equally spaced in azimuth above the +/−x and +/−y axes. The search increment used was % code chip. At each x-y grid point the user receiver time offset was also searched in ¼ chip increments and the plotted values for each x-y grid point correspond to the maximum combined power output over the user receiver clock time interval search. As shown in FIG. 8, the power output of each correlator was normalized to one. The PRN codes were assumed to be combined without losses due to carrier phase error. However, losses due to code phase error are present; hence, the maximum combined power output over the geometric surface is somewhat less than the N=5 satellite signals processed. The geometric surface of combined power exhibits the characteristic of a mountain peak (e.g. a power peak) with a maximum height at the simulated true user receiver location, in this case at the origin. As shown in FIG. 9, no noise was included; unlike in FIG. 10, simulated normal noise power is shown equivalent to an SNR of 12 dB=20 log(S/$\sigma$) (equivalent to C/N=12 dB-Hz for Tc=1 sec) at the output of each PRN code correlator. As shown in FIG. 10, the characteristic of the mountain peak and trend towards the maximum power output near the true user receiver location is still discernable for this sample run even with the noise present.

Note that the geometric pattern shown in FIG. 9 indicates multiple ridges, which triangulate to the true user receiver location at the origin. The ridges correspond to sets of locations where some of the signal PRN code phases are in agreement, but not all N signal code phases. For example, due to the selected geometry, three satellite PRN code signals still retain a coherent relationship along either the x or y axis. Only at the origin, however, do all N=5 code phases achieve coherency.

For Example 2, assume processing of L1 C/A code from 9 satellites, and an initial 2-D position and time uncertainty region of 1 km, searched in ⅓ chip increments. In this case, the assumed user equipment architecture consists of 10,000 parallel network banks of slaved correlators as shown in FIG. 6.

Number of grid-time points=$(1000 \text{ m}/100 \text{ m})^3$=1000
Number of carrier phase angle combinations=$8^9$=134.2 M
Total number of parallel search segments=1000*134.2 M/10,000=13.4 M
Total time to search assuming 100 MHz ASIC=13.4 M/100 MHz=0.13 sec.
Processing gain relative to one PRN code signal=9 satellites (9.5 dB)

According to Example 2, the practical limit for the assumed hardware architecture is about N=9 or 10 independent satellite signals. However, this limitation can be overcome for small uncertainty regions by using the modified carrier phase prediction processing as illustrated in Example 3.

Figure 11:
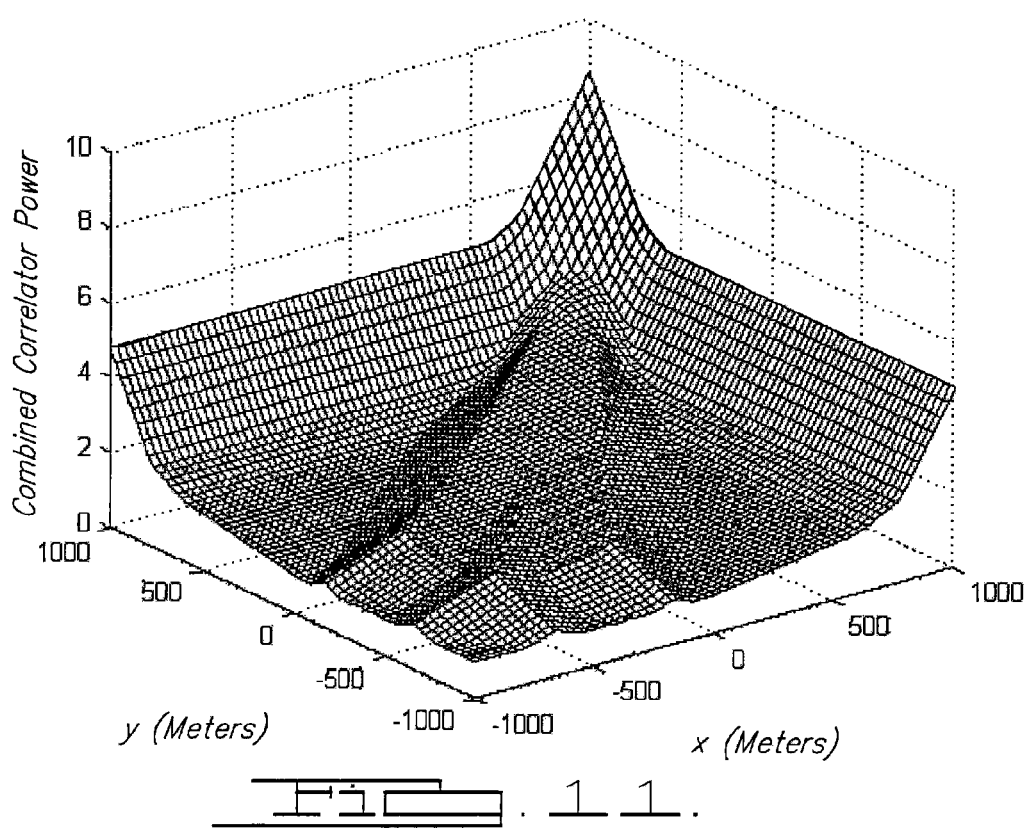
FIG. 11 is a graph illustrating power outputs over a 2-D search space region for a plurality of grid point locations (for a user receiver with nine satellites in view and zero noise)
Figure 12:
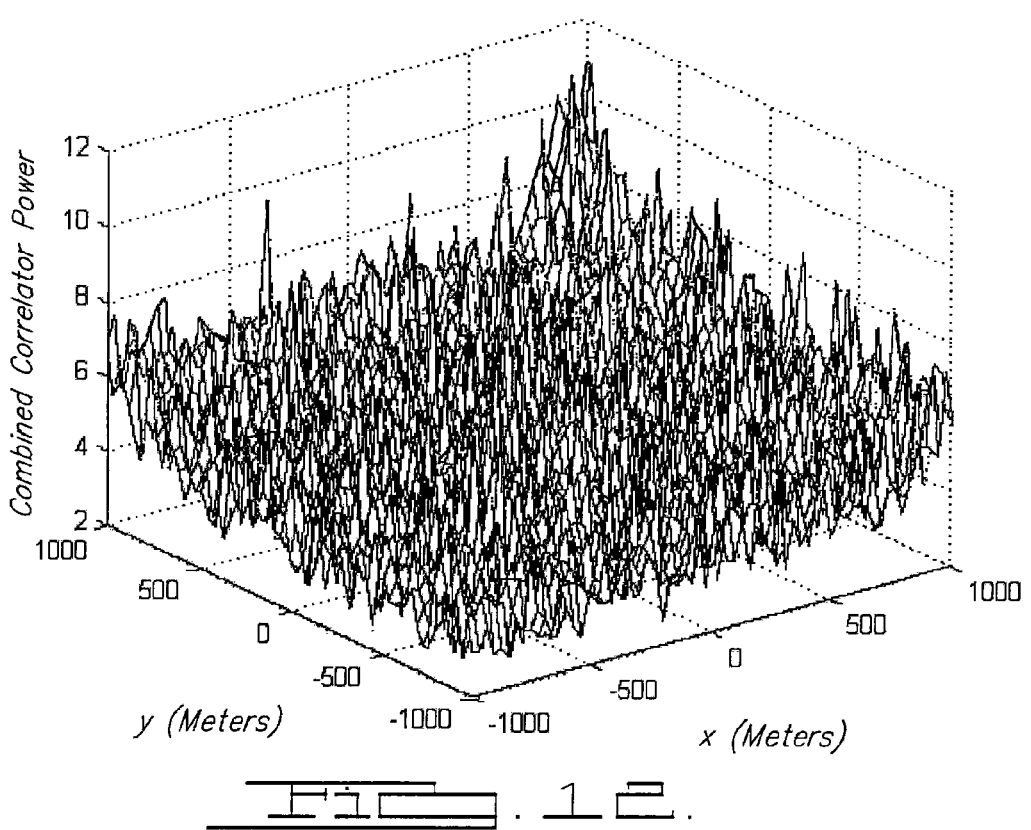
FIG. 12 is a graph illustrating power outputs over a 2-D search space region for a plurality of grid point locations (for a user receiver with nine satellites in view and an SNR=6 dB for each PRN code correlator output)

Referring FIGS. 11 and 12, the MATLAB simulation results are shown for the scenario of N=9 satellites with one satellite directly overhead, four satellites equally spaced in azimuth at an EL of 45 degrees, and four satellites equally spaced in azimuth at the horizon. In this case the simulated true user receiver location was selected at the rear corner of the search space, and for improved visualization the grid and user receiver time offset were searched in 1/10 chip increments instead of ⅓ chip increments of Example 2. As can be seen in FIG. 11, the geometric surface includes no noise, unlike as shown in FIG. 12. FIG. 12 shows simulated noise over the geometric surface at the output of each correlator corresponding to an SNR of 6 dB=20 log(S/$\sigma$) (equivalent to C/N=6 dB-Hz for Tc=1 sec). As before, the trend towards a maximum peak at the true user receiver location is still discernible even with the high level of noise present. Improved performance associated with discrimination of the trend near the peak is suggested by use of the higher resolution 1/10 chip spacing instead of ⅓ chip.

For Example 3, assume the modified carrier phase prediction processing approach in which the carrier phase angle relative to the base station is predicted at each grid point location using the carrier phase measurements from the base station. Additionally, assume a 3-D position-time uncertainty region of 100 meters—note that this assumption is very reasonable for the Hot Start, Subsequent Fix and Reacquisition user receiver modes and even for some network wireless assisted GPS modes. Assume the uncertainty region is divided into a fine resolution mesh with grid spacing of 5 cm.

Assume processing of 5 PRN code ranging signals from each of ten GPS satellites and ten Galileo satellites in view for a total of 100 PRN code signals processed.

Number of grid-time points=$(100 \text{ m}/0.05 \text{ m})^4$=$1.6 \times 10^{13}$
Total number of parallel search segments=$1.6 \times 10^{13}$/10,000=1.6 B
Total time to search assuming 100 MHz ASIC=1.6 B/100 MHz=16 sec
Processing gain relative to one PRN code signal=(20 satellites)*(5 codes/satellite)=100 (20 dB)

According to Example 3, the practical limit for the assumed hardware architecture and the modified processing using predicted carrier phase angles appears to be a position-time uncertainty region of about 100 meters. The processing gain without losses is 20 dB relative to acquisition of a single PRN code signal.

Figure 13:
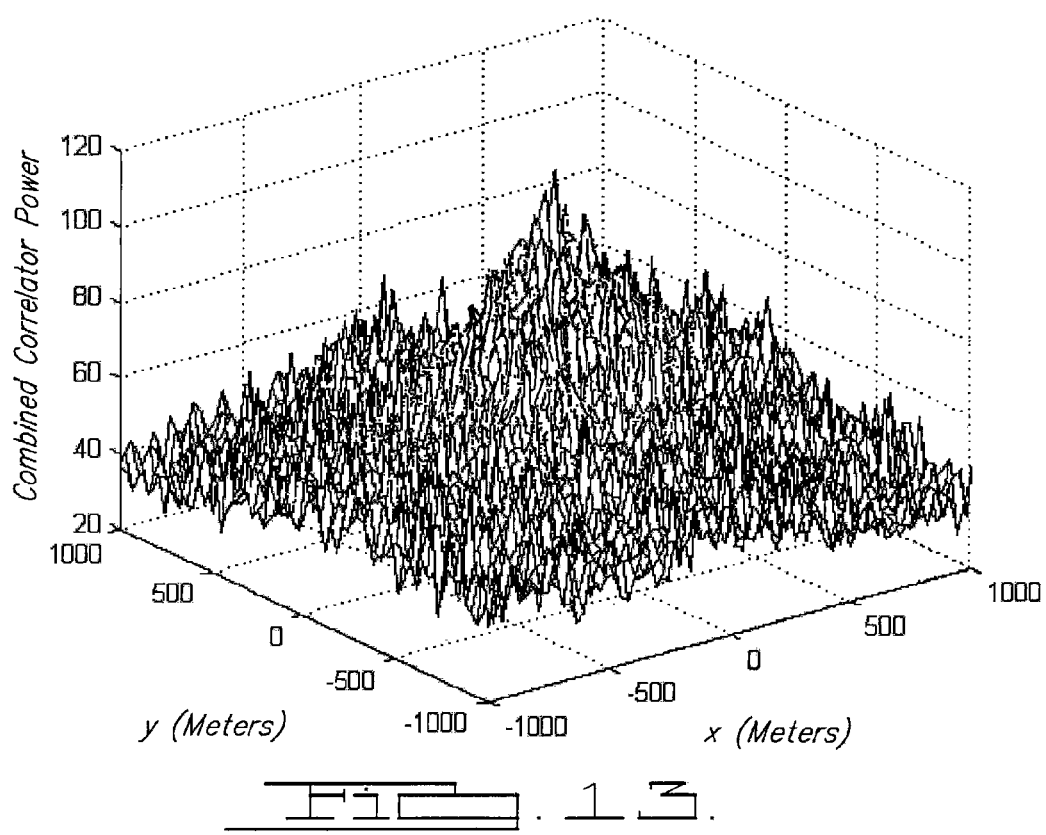
FIG. 13 is a graph illustrating power outputs over a 2-D search space region for a plurality of grid point locations (for a user receiver with twenty satellites in view, 5 PRN codes received from each satellite and an SNR=0 dB for each PRN code correlator output)

Shown in FIG. 13, the MATLAB simulation results are provided for the scenario of processing five signals from each of twenty satellites. The twenty satellites were selected at random LOSs, and the received power level in each PRN code signal was assumed to be the same. The output SNR of each correlator was simulated as 0 dB, and the "true" user receiver location was taken at the origin. The power surface forms a maximum peak near the true user receiver location, which is readily discernable even in the presence of this high noise level.

Figure 14:
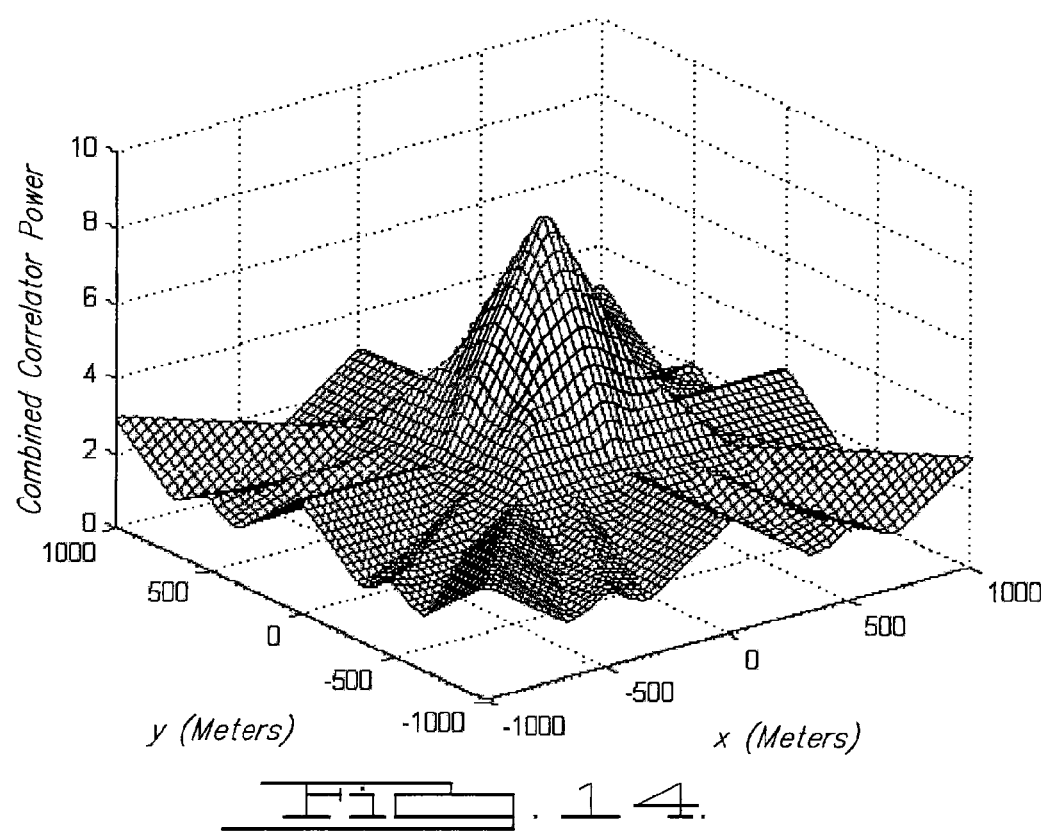
FIG. 14 is a graph illustrating power outputs over a horizontal cross section of a 3-D search space region for a plurality of grid point locations (for a user receiver having nine satellites in view and at z=0)
Figure 15:
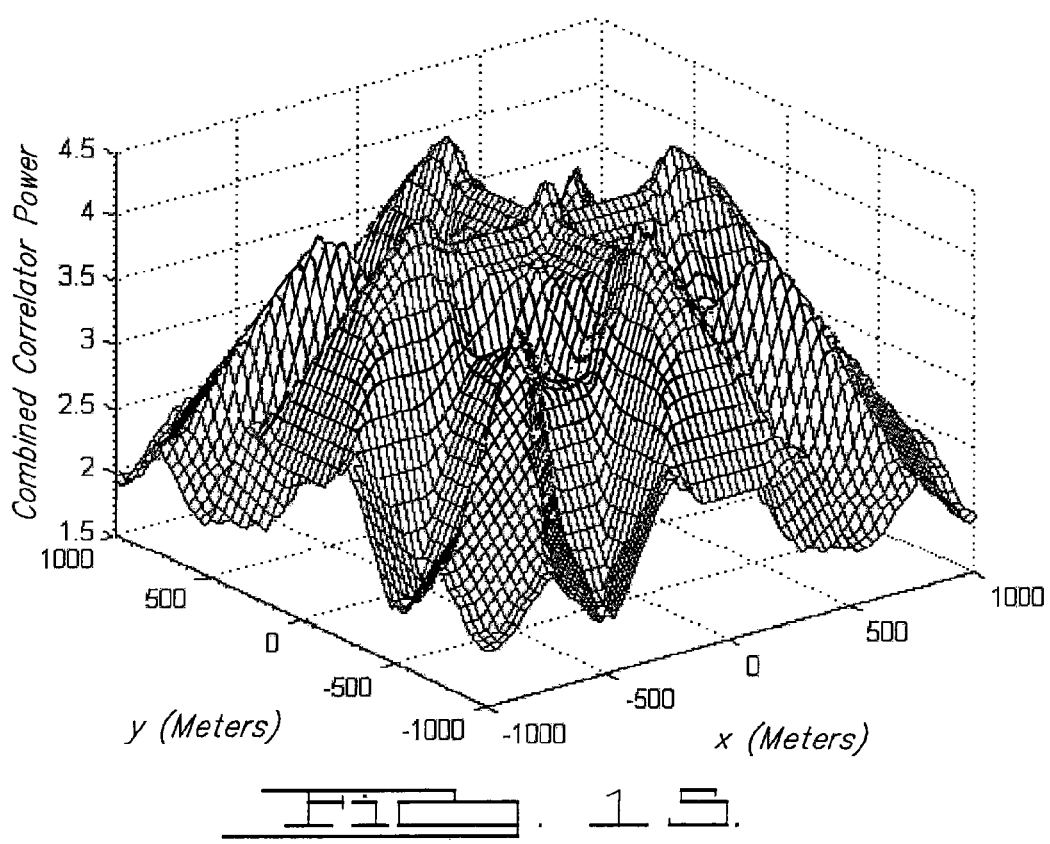
FIG. 15 is a graph illustrating power outputs over a horizontal cross section of a 3-D search space region for a plurality of grid point locations (for a user receiver having nine satellites in view and at z=500 m)
Figure 16:
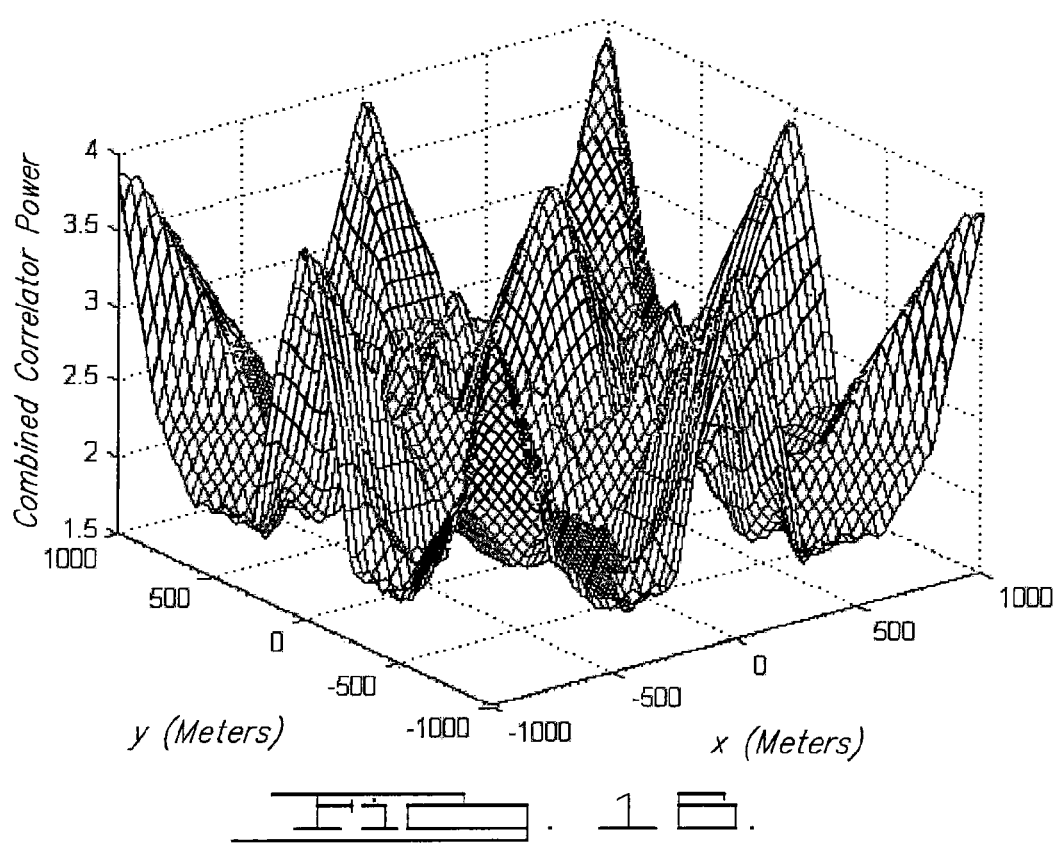
FIG. 16 is a graph illustrating power outputs over a horizontal cross section of a 3-D search space region for a plurality of grid point locations (for a user receiver having nine satellites in view and at z=1000 m).

Referring to FIGS. 14-16, MATLAB simulation results are disclosed for a 3-Dimensional simulation for an N=9 satellite case without noise. In this case, the "true" user receiver location was selected at the origin, e.g. (x,y,z)=(0,0,0). Cross sections of the power surface are shown for constant values of the vertical axis z. As seen, the expected trend of a maximum and peak is exhibited for the z=0 surface (FIG. 14), whereas the surfaces at z=+500 meters (FIG. 15) and z=+1000 meters (FIG. 16) indicate multiple local maximum peaks with less power than the peak at z=0. These results illustrate the effectiveness of the use of image processing techniques, smart algorithms to analyze discrimination parameters extracted from the smoothed power surface and used to identify the probable solution and its reliability.

The method 10 and system 50 disclosed is especially effective in operating in stressed situations or weak signal carrier-to-noise power ratio (C/No) conditions, in both civilian commercial sector and military sector applications. One reason for this is that the method 10 and the system 50 avoids squaring of any signal, as is done in traditional GPS signal processing techniques. For SNR<0 dB, squaring tends to amplify the noise power relative to the signal power. Additionally, the method 10 and the system 50 provided herein enables automatic removal of errors common to both the base station 54 and the user receiver 56 and is generally immune to multipath affecting one or a few satellite ranging signals. Processing by the base station 54 helps to minimize an introduction of multipath errors into ranging data sent to the user receiver 56.

While various embodiments have been described, those skilled in the art will recognize modifications or variations that might be made without departing from the inventive concept. The examples illustrate the disclosure herein, and are not intended to limit it. Therefore, the description and claims should be interpreted liberally with only such limitation as is necessary in view of the pertinent prior art.

What is claimed is:

1. A method of rapidly determining a location of a global positioning system (GPS) receiver, the method comprising:
using a base station having a known location to receive ranging signals ranging data from a plurality of satellites within view of the user receiver;

receiving, at the user receiver, from the base station, a set of initialization data, base-station location data, time aiding data and boundary data, prior to using said user receiver in attempting to determine a pseudorange of a first one of said satellites;

using the user receiver to receive a time synch function from the base station to synchronize a user receiver clock and ranging signals ranging data as received at the base station at an epoch time;

using the user receiver to search within a Earth-reference search space region and a predefined search space boundary having a plurality of grid point locations based on the base-station-location data;

acquiring simultaneously least two of the satellite ranging signals from each of the plurality of satellites in view of the user receiver;

searching over carrier phase angle combinations for received ranging signals at each of the plurality of grid points;

combining power outputs of the received ranging signals at each of the plurality of grid point locations, and determining therefrom a probable location of the user receiver; and assessing reliability of the probable location.

2. The method of claim 1, wherein combining power outputs further comprises determining the probable location when a maximum coherently combined power output is detected.

3. The method of claim 2, further comprising:
analyzing a smoothed geometric surface model of combined power output surface data over the search space region to locate the maximum power output.

4. The method of claim 3, wherein analyzing the smoothed geometric surface model of the combined power output surface data further comprises:
adjusting a user receiver time offset to maximize each of the combined power outputs corresponding to a particular grid point location;
predicting an image pattern for the combined power outputs over the resulting search space region based on predicted geometry and signal characteristics of each said received satellite ranging signal;
applying algorithms and image processing techniques to analyze the smoothed geometric surface model relative to residual noise to enhance detection of the maximum power output;
generating discrimination parameters from the smoothed geometric surface model associated with slopes, peaks and ridges in the smoothed geometric surface model; and
validating the probable location solution by analyzing the discrimination parameters to confirm that the probable location corresponds to a maximum peak in the smoothed geometric surface model and that the ridges in the smoothed geometric surface model triangulate to the probable location.

5. The method of claim 4, wherein applying the image processing techniques further comprises applying the image processing techniques to smooth the noise relative to the image pattern, by fitting a smoothed predicted geometric surface model to the combined power output surface data; and thus locking onto underlying signal surface characteristics to determine the maximum power output.

6. The method of claim 4, further comprising:
perturbing a converged ultra-tight coupling (UTC) GPS/INS solution;

processing the received ranging signals in order to coherently combine the power outputs at a converged UTC solution grid point;

processing the received ranging signals in order to attempt to coherently combine the power outputs of the received ranging signals at each of the plurality of grid point locations in a vicinity of the converged UTC GPS/INS coupling solution to determine a second probable location;

fitting a geometric surface model to the power outputs associated with the converged UTC GPS/INS solution grid point and the power outputs associated with nearby fit points;

determining the reliability of the converged UTC GPS/INS solution by:
analyzing the geometric surface model to determine if the converged UTC GPS/INS solution grid point corresponds to the maximum power output, indicating the processing is tracking actual GPS signals; and
analyzing the geometric surface model to determine if the converged solution may not be associated with a maximum power output peak, indicating the processing may not be tracking the actual GPS signals.

7. The method of claim 5, further comprising:
processing multiple snap shots of the geometric surface model over a predetermined period of time in order to determine the probable location.

8. The method of claim 7, wherein processing the multiple snap shots of the geometric surface model over time further comprises:
evolving the smoothed geometric surface model in a predictable fashion based on known geometry and use of motion models to predict dynamics of its geometric surface;
filtering the combined power outputs of the geometric surface over time to produce smooth combined power outputs;
interpolating the smoothed combined power outputs geometric surface model to locate the maximum combined power output at a particular grid point location and time epoch that corresponds to the probable location of the user receiver;
generating discrimination parameters associated with slopes, peaks and ridges in the smoothed power surface model; and
analyzing the discrimination parameters to confirm that the probable location corresponds to a maximum peak in the geometric surface and that the ridges in the geometric surface triangulate to the probable location.

9. The method of claim 1, wherein accessing the reliability of the probable location further comprises:
computing residual noise jitter of the combined power output data over the search space region relative to the smoothed geometric surface model; and
comparing the smoothed geometric surface model at the probable location to the residual noise jitter to predict reliability of the probable location.

10. The method of claim 1, wherein combining power outputs of the received satellite ranging signals further comprises:
determining when the combined power output data over the search space region or the smoothed geometric surface model indicates that no clear maximum power peak exists, thus indicating that the probable location cannot be reliably determined;

using algorithms which make use of a priori or received information to preferentially modify and control the processing for at least one of:
- preferential use of a subset of the satellites in view of the user receiver associated with the strongest power levels,
- preferential use of a type of PRN code signals,
- preferentially processing signals from frequency bands with lower interference or higher predicted carrier-to-noise power ratio to enhance performance;
- modifying signal combining weights; and
- predicting the probable location of the user receiver.

11. The method of claim 1, wherein acquiring simultaneously at least one satellite ranging signal from the plurality of satellites in view further comprises:
- determining when received ones of the satellite ranging signals include strong signals and weak signals;
- determining when a number of the strong signals equal less than a predetermined number of strong signals needed to determine the probable location based on processing measured pseudoranges;
- constraining the carrier phase angle combinations to measured quantities of the strong signals;
- searching through the weak signals using a constrained search space region based on code and carrier phase measurement data related to the strong signals; and
- determining the probable location where the search is performed only over the carrier phase angle offsets of the weak signals.

12. The method of claim 1, further comprising:
using ultra-tight coupling techniques to predict an optimal coherent integration time for processing each said satellite ranging signal and computing weights for combining each said power output of the satellite ranging signals.

13. A method for rapidly determining a position of a user receiver in a global positioning system, the method comprising:
- using a base station remote from the receiver, and having a known location, to receive ranging signals ranging data from a plurality of satellites within view of the receiver;
- using the receiver to receive, from the remote base station, a set of initialization data, base-station location data and time aiding data, prior to the receiver attempting to acquire satellite codes from a first one of the plurality of satellites in view of the receiver;
- receiving from the remote base station, at the receiver, a time synch function to synchronize a user receiver clock and ranging data including code and carrier phase ranging data, as received at the remote base station, at an epoch time;
- using the receiver to predict PRN code signal carrier phase angles relative to each one of a plurality of grid point locations within an Earth reference search space region;
- using the receiver to search within the search space region at a plurality of grid point locations based on the base-station-location data, ranging data received from the remote station, and predicted PRN code phase and carrier phase angles;
- acquiring simultaneously at least one of the ranging signals from each of the plurality of satellites in view of the user receiver; and
- combining power outputs of the received ranging signals at each of the plurality of grid point locations, and determining therefrom a probable location of the receiver with the search space region.

14. The method of claim 13, wherein combining power outputs further comprises:
- receiving carrier phase measurements from the base station at the epoch time in addition to the PRN code phase measurements;
- using a finer resolution grid over the search space region in which spacing for the grid point locations are a fraction of a carrier cycle,
- predicting the code phase measurements and the carrier phase measurements as received at each said grid point location;
- at each said grid point location, adjusting the user receiver clock offset to maximize the combined power outputs; and
- determining therefrom a probable location, wherein the grid point location associated with a maximum coherently combined power output indicates the probable location of the receiver.

15. A global positioning system (GPS) user receiver for rapidly determining a position of the user receiver in a global positioning system, the GPS user receiver comprising:
- a user interface adapted to generate a request signal and receive an indication of a location of the user receiver;
- a base-station-receiving portion for wirelessly receiving initialization data, ranging data as received by the base station at an epoch time, and base-station-location data to limit dimensions of a search space to a predetermined geographic area circumscribing a present location of the user receiver, in which the predetermined geographic area has a plurality of grid point locations, and to output a search signal in response and a time synch function in response thereto to synchronize a user receiver clock at an epoch time, prior to the user receiver attempting to acquire satellite ranging signals;
- a navigation system configured to receive the initialization data and the base-station location data and to search within the predetermined geographic area for at least one of said satellite ranging signals from a plurality of GPS satellites that are within view of the user receiver, the navigation system operating to combine power outputs of all received ones of said ranging signals at each of the grid point locations within the predetermined geographic area to produce a maximum coherently combined power output value; and
- a control processing unit in communication with the navigation system and configured to receive the maximum power output and to determine the location of the user receiver, and to output a location signal in response thereto.

16. The GPS receiver of claim 15, wherein the navigation system coherently combines the power outputs to determine the location of the user receiver when a maximum power output is detected.

17. The GPS receiver of claim 16, wherein the control processing unit operates to generate and analyze a smoothed geometric surface model fit to the combined power outputs over the search space region to locate the maximum coherently combined power output.

18. The GPS receiver of claim 17, wherein the control processing unit analyzes the smoothed geometric surface model of combined power outputs, and wherein the control processing unit uses smart algorithms and imaging processing techniques to analyze the combined power outputs and to determine the maximum power output based on peaks and ridges of the smoothed geometric surface model, and to assess the reliability of the probable user location solution by analyzing discrimination parameters extracted from the smoothed geometric surface model.

19. The GPS receiver of claim 15, wherein the control processing unit implements ultra-tight coupling to aide in determining the location of the user receiver during jamming conditions or weak signal environments.

20. The GPS receiver of claim 15, wherein the navigation system comprises at least one network bank of slaved correlators configured to combine power outputs of all received ranging signals at each of the plurality of grid point locations to thus provide the maximum coherently combined power output value at a probable user receiver location.

* * * * *